US008082216B2

(12) United States Patent
Obana et al.

(10) Patent No.: US 8,082,216 B2
(45) Date of Patent: Dec. 20, 2011

(54) INFORMATION PROCESSING APPARATUS, METHOD AND PROGRAM HAVING A HISTORICAL USER FUNCTIONALITY ADJUSTMENT

(75) Inventors: Michimasa Obana, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 12/136,480

(22) Filed: Jun. 10, 2008

(65) Prior Publication Data

US 2008/0319930 A1 Dec. 25, 2008

(30) Foreign Application Priority Data

Jun. 11, 2007 (JP) ................................ 2007-153959

(51) Int. Cl.
*G06F 15/18* (2006.01)

(52) U.S. Cl. ........................................................ 706/14

(58) Field of Classification Search ........................ None
See application file for complete search history.

(56) References Cited

U.S. PATENT DOCUMENTS 7,212,245 B2 5/2007 Kondo et al.
7,574,072 B2 * 8/2009 Fujii et al. .................... 382/300
2004/0233331 A1 11/2004 Kondo
2006/0041332 A1 * 2/2006 Sabe et al. .................... 700/245
2008/0253437 A1 * 10/2008 Kim et al. ..................... 375/228

FOREIGN PATENT DOCUMENTS

JP 2002-218414 8/2002
JP 2003-224797 8/2003

* cited by examiner

*Primary Examiner* — Michael B. Holmes
*Assistant Examiner* — Li-Wu Chang
(74) *Attorney, Agent, or Firm* — Oblon, Spivak, McClelland, Maier & Neustadt, L.L.P.

(57) ABSTRACT

An information processing apparatus includes: strength estimation means for calculating an operation frequency for each predetermined time period from an operation history, and estimating a time period of the operation frequency which exceeds a predetermined value as a time period over which the user has a strong desire to adjust; detecting means for calculating, from the operation history, an operation frequency for each function of the electronic apparatus of the operation history in a time period corresponding to the time period of the strong desire to adjust estimated by the strength estimation means, and detecting a feature of the adjustment operation made by the user for the function of the electronic apparatus, the feature corresponding to the operation frequency for each function of the electronic apparatus; and determination means for determining a function, desired by the user to adjust, of the electronic apparatus, the function corresponding to the feature detected by the detecting means.

7 Claims, 17 Drawing Sheets

INFORMATION PROCESSING APPARATUS, METHOD AND PROGRAM HAVING A HISTORICAL USER FUNCTIONALITY ADJUSTMENT

CROSS-REFERENCE TO RELATED APPLICATIONS

The present application claims benefit of priority of Japanese patent Application No. 2007-153959 filed in the Japanese Patent Office on Jun. 11, 2007, the entire disclosure of which is incorporated herein by reference.

BACKGROUND OF THE INVENTION

1. Field of the Invention

The present invention relates to an information processing apparatus and method and a program, and more particularly to an information processing apparatus and method capable of determining an additional function matching a user and a program.

2. Description of Related Art

There exists a service of collecting an electronic apparatus such as a television (TV) receiver, analyzing a user operation of the electronic apparatus, implementing a function matching the user in the electronic apparatus in accordance with the analysis results, and returning the electronic apparatus to the user.

More specifically, for example as shown in FIG. 1, operation history data (so-called operation log) stored in a storage unit of a predetermined substrate (bay) built in an electronic apparatus is analyzed, and preference, interest and the like of the user are estimated in accordance with the analysis results. A function corresponding to the estimated preference and the like of the user is determined as an additional function matching the user, and the determined additional function is added to the electronic apparatus.

Japanese Unexamined Patent Application Publication No. 2003-224797 discloses a method of determining parameters for determining an image quality in accordance with adjustment history of image quality adjustment parameters, and adding an image processing function adopting the determined parameters.

SUMMARY OF THE INVENTION

With an earlier developed method, however, all operation history data acquired from a substrate bay of an electronic apparatus is processed uniformly and analyzed as it is. Since an additional function is determined from all operation history data including operation history data essentially irrelevant to user's desire, an additional function matching the user is not determined properly in some cases.

Accordingly, it is desirable to enable to determine an additional function matching a user in depth.

In accordance with one aspect of the present invention, there is provided an information processing apparatus for determining a function of an electronic apparatus desired by a user to adjust, based on an operation history of adjustment operations made by the user for the function of the electronic apparatus, the information processing apparatus including a strength estimation means, a detecting means, and a determination means. The strength estimation means calculates, from the operation history, an operation frequency for each predetermined time period and estimates a time period of the operation frequency which exceeds a predetermined value as a time period over which the user has a strong desire to adjust. The detecting means calculates, from the operation history, an operation frequency for each function of the electronic apparatus of the operation history in a time period corresponding to the time period of the strong desire to adjust estimated by the strength estimation means, and detects a feature of the adjustment operation made by the user for the function of the electronic apparatus, the feature corresponding to the operation history for each function of the electronic apparatus. The determination means determines a function, desired by the user to adjust, of the electronic apparatus, the function corresponding to the feature detected by the detecting means.

The detecting means may include: frequency distribution generating means for generating a frequency distribution of the operation frequency, for each function of the electronic apparatus, of the operation history in the time period corresponding to the time period of the strong desire to adjust estimated by the strength estimation means; comparing means for comparing the frequency distribution generated by the frequency distribution generating means with a distribution, corresponding to the feature, of the operation frequency for each function of the electronic apparatus; and feature detection means for detecting the feature using a comparison result by the comparing means.

The frequency distribution generating means may generate a first frequency distribution of the operation frequency, for each function of the electronic apparatus, of the operation history in the time period corresponding to the time period of the strong desire to adjust estimated by the strength estimation means, and a second frequency distribution of the operation frequency, for each function of the electronic apparatus, of the operation history in a time period corresponding to a time period of a weak desire to adjust estimated by the strength estimation means. The information processing apparatus may further include normalized frequency distribution calculating means for calculating a normalized frequency distribution by subtracting an operation frequency of the second frequency distribution for the same function from an operation frequency of the first frequency distribution. The comparing means compares the normalized frequency distribution calculated by the normalized frequency distribution generating means with a distribution, corresponding to the feature, of the operation frequency for each function of the electronic apparatus.

The information processing apparatus may further include providing means for providing the function determined by the determination means to the electronic apparatus or another electronic apparatus.

In accordance with another aspect of the present invention, there is provided an information processing method or a program including: in an information processing method for determining a function of an electronic apparatus desired by a user to adjust, based on an operation history of adjustment operations made by the user for the function of the electronic apparatus, a strength estimation step of calculating, from the operation history, an operation frequency for each predetermined time period and estimating a time period of the operation frequency which exceeds a predetermined value as a time period over which the user has a strong desire to adjust; a detecting step of calculating, from the operation history, an operation frequency for each function of the electronic apparatus of the operation history in a time period corresponding to the time period of the strong desire to adjust estimated by the strength estimation step, and detecting a feature of the adjustment operation made by the user for the function of the electronic apparatus, the feature corresponding to the operation frequency for each function of the electronic apparatus; and a determination step of determining a function, desired by the user, of the electronic apparatus, the function corresponding to the feature detected by the detecting step.

According to another aspect of the present invention, the operation frequency for each predetermined time period is calculated from the operation history, and the time period of the operation frequency exceeding a predetermined value is estimated as a time period over which the user has a strong desire to adjust. By using the operation history, an operation history, for each function of the electronic apparatus, of the operation history made in a time period corresponding to the time period of the strong desire to adjust is calculated, and the feature of adjustment operations of the user for each function of the electronic apparatus is detected, the feature corresponding to the operation frequency for each function of the electronic apparatus. A function of the electronic apparatus, which the user desires to adjust, is determined, corresponding to the detected feature.

According to embodiments of the present invention, it is possible to determine an additional function matching a user in depth.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

In the following description of the embodiments of the present invention, the correspondence between constituent elements of the present invention and embodiments described in the specification or drawings is as follows. The description is used for ascertaining whether the embodiments supporting the inventions described in this specification or drawings are described in the specification. Therefore, embodiments described in this specification or drawings, which are not described here as the constituent elements of the present invention, are not intended to mean that the embodiment does not correspond to the constituent elements of the present invention. Conversely, embodiments described in this specification, which are described here as corresponding to the constituent elements, are not intended to mean that the embodiments do not correspond to constituent elements other than the constituent elements.

Figure 1:
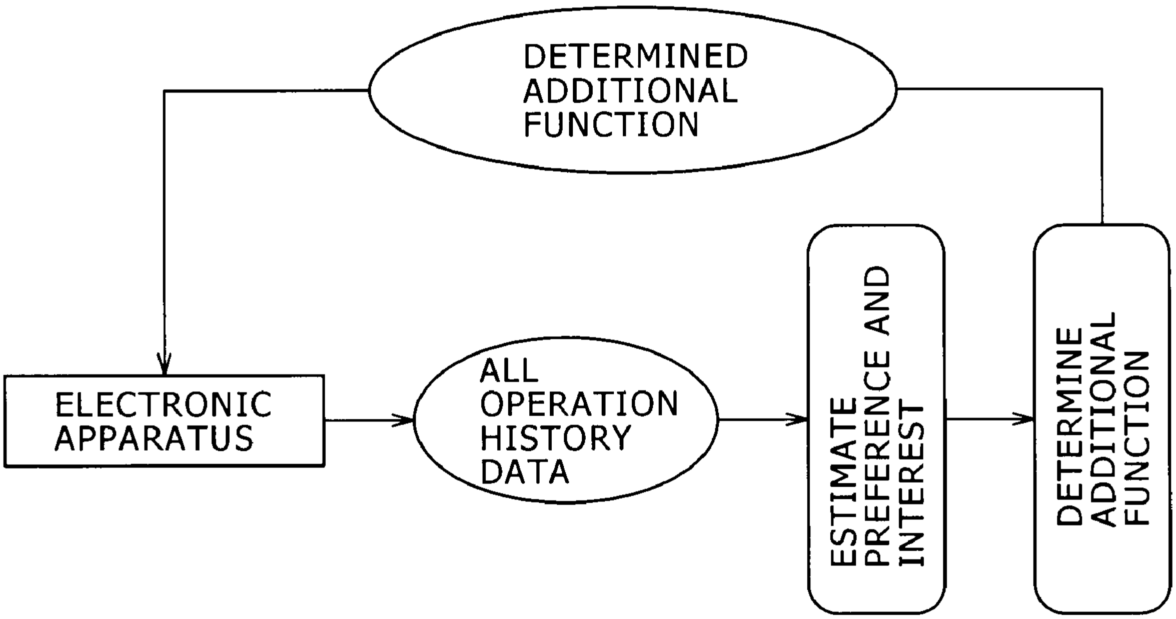
FIG. 1 is a diagram illustrating an earlier developed process of determining an additional function.
Figure 2:
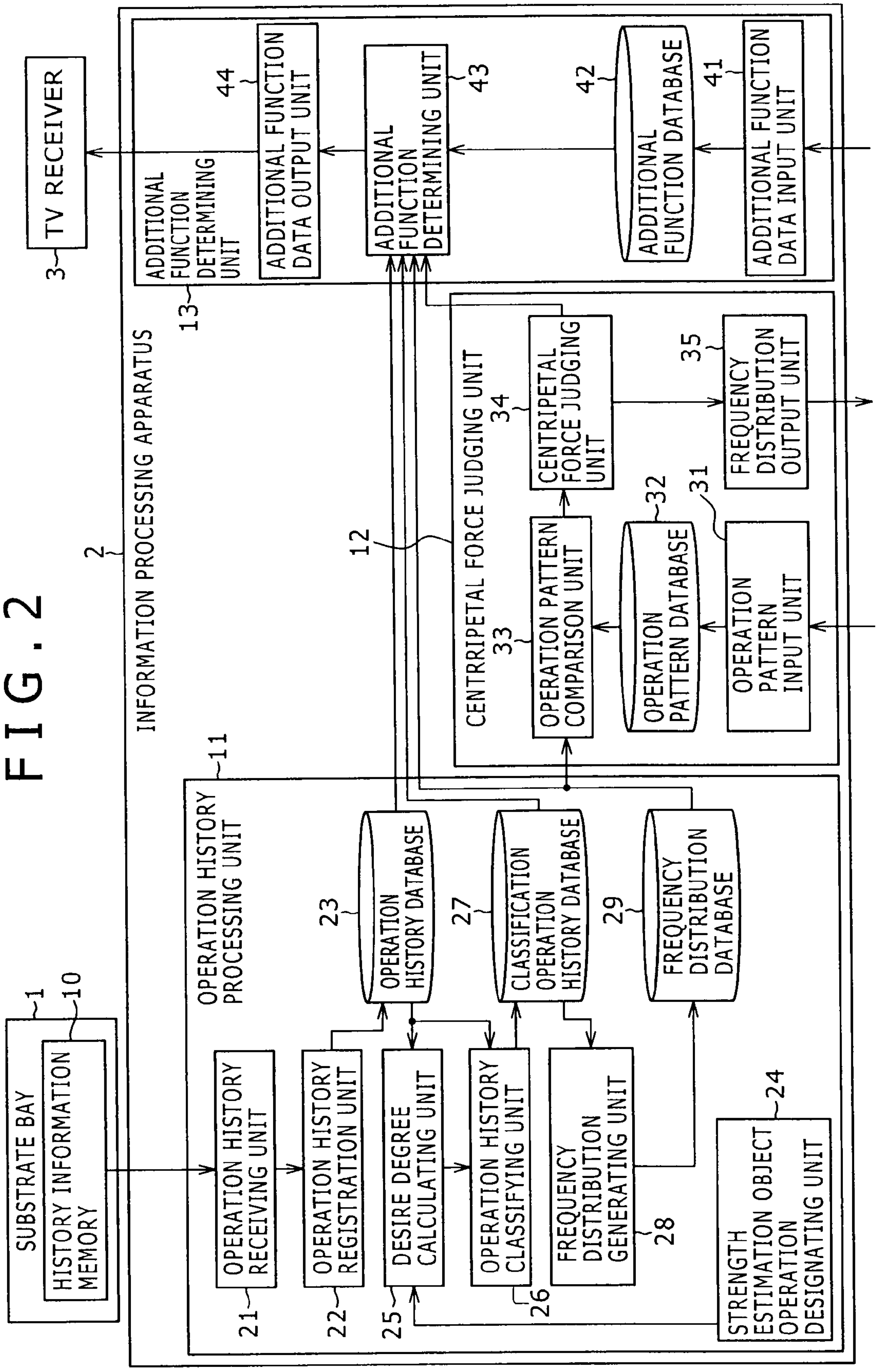
FIG. 2 is a diagram showing an example of the structure of an information processing apparatus 2 adopting an embodiment of the present invention.

In accordance with an embodiment of the present invention, there is provided an information processing apparatus for determining a function of an electronic apparatus desired by a user to adjust, based on an operation history of adjustment operations made by the user for the function of the electronic apparatus, the information processing apparatus including a strength estimation means (e.g., an operation history processing unit 11 shown in FIG. 2), a detecting means (e.g., a centripetal force judging unit 12 shown in FIG. 2), and a determination means (e.g., an additional function determining unit 12 shown in FIG. 2). The strength estimation means calculates, from the operation history, an operation frequency for each predetermined time period and estimates a time period of the operation frequency which exceeds a predetermined value as a time period over which the user has a strong desire to adjust. The detecting means calculates, from the operation history, an operation frequency for each function of the electronic apparatus of the operation history in a time period corresponding to the time period of the strong desire to adjust estimated by the strength estimation means, and detects a feature of the adjustment operation made by the user for the function of the electronic apparatus, the feature corresponding to the operation history for each function of the electronic apparatus. The determination means determines a function, desired by the user to adjust, of the electronic apparatus, the function corresponding to the feature detected by the detecting means.

The detecting means may include: frequency distribution generating means (e.g., a frequency distribution generating unit 28 shown in FIG. 2 or a frequency distribution generating unit 61 shown in FIG. 15) for generating a frequency distribution of the operation frequency, for each function of the electronic apparatus, of the operation history in the time period corresponding to the time period of the strong desire to adjust estimated by the strength estimation means; comparing means (e.g., an operation pattern comparing unit 33 shown in FIG. 2) for comparing the frequency distribution generated by the frequency distribution generating means with a distribution, corresponding to the feature, of the operation frequency for each function of the electronic apparatus; and feature detection means (e.g., a centripetal force judging unit 34 shown in FIG. 2) for detecting the feature using a comparison result by the comparing means.

The frequency distribution generating means (e.g., a frequency distribution generating unit 61 shown in FIG. 15) may generate a first frequency distribution of the operation frequency, for each function of the electronic apparatus, of the operation history in the time period corresponding to the time period of the strong desire to adjust estimated by the strength estimation means, and a second frequency distribution of the operation frequency, for each function of the electronic apparatus, of the operation history in a time period corresponding to a time period of a weak desire to adjust estimated by the strength estimation means. The information processing apparatus may further include normalized frequency distribution calculating means (e.g., a normalized frequency distribution calculating unit 62 shown in FIG. 15) for calculating a normalized frequency distribution by subtracting an operation frequency of the second frequency distribution for the same function from an operation frequency of the first frequency distribution. The comparing means compares the normalized frequency distribution calculated by the normalized frequency distribution generating means with a distribution, corresponding to the feature, of the operation frequency for each function of the electronic apparatus.

The information processing apparatus may further include providing means (e.g., an additional function data outputting unit 44 shown in FIG. 2) for providing the function determined by the determination means to the electronic apparatus or another electronic apparatus.

In accordance with another embodiment of the present invention, there is provided an information processing method or a program including: in an information processing method for determining a function of an electronic apparatus desired by a user to adjust, based on an operation history of adjustment operations made by the user for the function of the electronic apparatus, a strength estimation step (e.g., step S5 in FIG. 6) of calculating, from the operation history, an operation frequency for each predetermined time period and estimating a time period of the operation frequency which exceeds a predetermined value as a time period over which the user has a strong desire to adjust; a detecting step (e.g., step S14 in FIG. 7) of calculating, from the operation history, an operation frequency for each function of the electronic apparatus of the operation history in a time period corresponding to the time period of the strong desire to adjust estimated by the strength estimation step, and detecting a feature of the adjustment operation made by the user for the function of the electronic apparatus, the feature corresponding to the operation frequency for each function of the electronic apparatus; and a determination step (e.g., step S19 in FIG. 7) of determining a function, desired by the user, of the electronic apparatus, the function corresponding to the feature detected by the detecting step.

Embodiments of the present invention will be described with reference to the accompanying drawings.

FIG. 2 shows an example of a logger system configuration adopting an embodiment of the present invention.

A substrate bay 1 is a substrate to be mounted in a TV receiver 3 dismounted from the TV receiver 3, and is mounted detachably on an information processing apparatus 2. A history information memory 10 of the substrate bay 1 stores operation history data of user's adjustment operations for the functions of the TV receiver 3. When the substrate bay 1 is mounted on the information processing apparatus 2, the operation history data stored in the history information memory 10 is supplied to the information processing apparatus 2.

The information processing apparatus 2 acquires the operation history data of various adjustment operations for the functions of the TV receiver 2 from the history information memory 10 of the substrate bay 1 which has been built in the TV receiver 3, and analyzes the operation history data. On the basis of the analysis results, an additional function determining process is performed to determine an additional function matching the user. The information processing apparatus 2 supplies the TV receiver 3 with additional function data necessary for implementing the additional function determined by the additional function determining process.

The TV receiver 3 stores the operation history data representative of an operation content (for example, type, date and the like of adjustment operations) of user's adjustment operations for the functions of the TV receiver 3, in the history information memory 10 of the substrate bay 1.

The TV receiver 3 receives the additional function data supplied from the information processing apparatus 2 and performs a predetermined process to allow the additional function to be usable. For example, the TV receiver 3 automatically starts a program contained in the additional function data supplied from the information processing apparatus 2 to perform the predetermined process and install the additional function. As a result, the user of the TV receiver 3 can utilize the additional function after the TV receiver 3 is returned to the user. The additional function is provided in this manner.

The outline of the additional function determining process by the information processing apparatus 2 will be described with reference to FIG. 3. On the basis of the operation history data of adjustment operation for the functions of the TV receiver 3 acquired from the history information memory 10 of the substrate bay 1, an adjustment desire strength of the user is obtained relative to a predetermined function (hereinafter called "strength estimation object function") of the TV receiver 3.

Specifically, an operation frequency, e.g., per day, of adjustment operations (hereinafter called "strength estimation object operation") for the strength estimation object function is obtained as the adjustment desire degree.

On the basis of the obtained adjustment desire degree, a time period over which a strong adjustment is desired is estimated, operation history data of adjustment operations made during this time period is extracted as data suitable for estimating the user's adjustment desire. The operation history data extracted as the data suitable for estimating the user's adjustment desire is called hereinafter significant operation history data.

For example, operation history data of adjustment operations made on the day on which a frequency of strength estimation object operations is high is extracted as the significant operation history data.

On the basis of the significant operation history data, a factor making the user provoke and attract an adjustment desire (e.g., a feature of user's adjustment operations for the functions of the TV receiver 3) (hereinafter called "centripetal force") is estimated.

Specifically, an operation frequency of adjustment operations (hereinafter called "desire estimation object operation") for a predetermined function (a function other than the strength estimation object function) (hereinafter called "desire estimation object function") made on the day having a high frequency of strength estimation object operations is estimated. The centripetal force is estimated based on the operation frequency.

The centripetal force will be described specifically. For example, for a user adjustment desire of obtaining a high image quality, a feature of adjustment operations of "adjusting an image quality" becomes the centripetal force, and for a user adjustment desire of obtaining a user-specific image, a feature of adjustment operations of "processing an image" becomes the centripetal force.

As the centripetal force is estimated in this manner, an additional function corresponding to the estimated centripetal force is determined.

Figure 4:
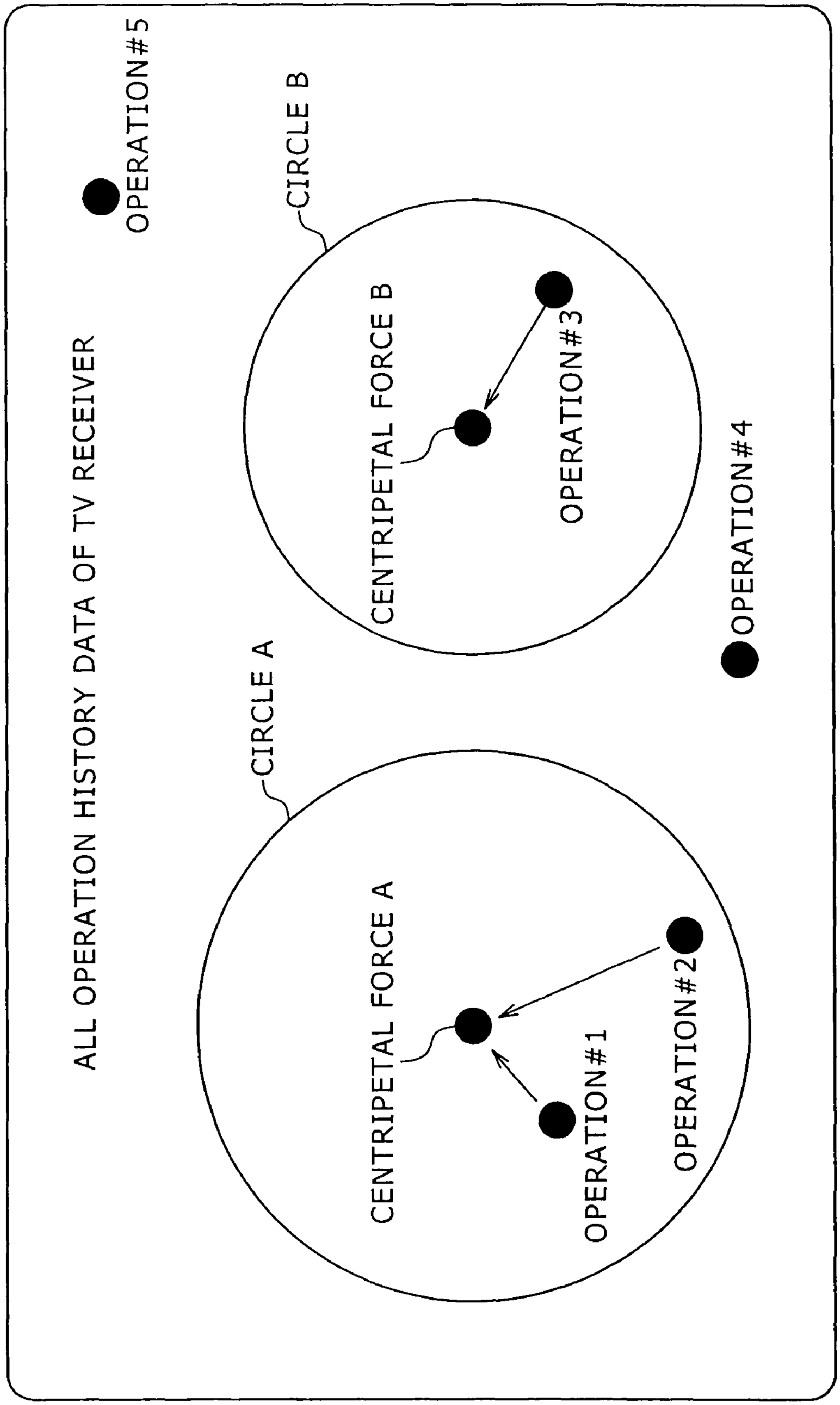
FIG. 4 is a schematic diagram illustrating the relation between desire corresponding to a strength estimation object operation and actual operation.

FIG. 4 schematically shows the relation between a centripetal force and an actually performed (adjustment) operation. In FIG. 4, a distance between "centripetal force" and "operation" corresponds to an adjustment desire degree of the strength estimation object function, and a positional relation (direction) therebetween corresponds to a content of the adjustment desire of the strength estimation object function. Assuming that a history of actions as a result of the user adjustment desire is an operation history, each "operation" is distributed around each of countless "centripetal forces".

In the example shown in FIG. 4, a centripetal force A is estimated from an operation having a strong adjustment desire for the strength estimation object function corresponding to the centripetal force A, i.e., from desire estimation object operations: operations #1 and #2 and the like in an operation group having a short distance to the centripetal force A (operation group distributed inside a circle A). A centripetal force B is estimated from an operation having a strong adjustment desire for the strength estimation object function corresponding to the centripetal force B, i.e., from desire estimation object operations: operations #3 and the like in an operation group having a short distance to the centripetal force B (operation group distributed inside a circle B).

Reverting to FIG. 2, the configuration of the information processing apparatus 2 will be described. The information processing apparatus 2 is operated by an operator analyzing the substrate bay 1 by using the information processing apparatus 2.

The information processing apparatus 2 includes an operation history processing unit 11, a centripetal force judging unit 12, and an additional function determining unit 13.

The operation history processing unit 11 receives operation history data supplied from the history information memory 10 of the substrate bay 1, and obtains an operation frequency, e.g., per day, of strength estimation object operations, based on the received operation history data. The operation history processing unit 11 classifies the received operation history data into significant operation history data which is operation history data of adjustment operations made on the day having a high operation frequency of strength estimation object operations, and into insignificant operation history data which is operation history data of adjustment operations made on other days.

On the basis of the operation history data classified into significant data, the operation history processing unit 11 obtains an operation frequency of adjustment operations (i.e., desire estimation object operations), for example, for a predetermined function (i.e., desire estimation object function) other than the strength estimation object function, generates a frequency distribution of operations for each desire estimation object function, and supplies the frequency distribution to the centripetal force judging unit 12.

The centripetal force judging unit 12 compares the frequency distribution supplied from the operation history processing unit 11 with a frequency distribution corresponding to a predetermined centripetal force externally inputted, i.e., with a feature of adjustment operations for the desire estimation object function, to thereby detect an operation pattern near the frequency distribution supplied from the operation history processing unit 11, and notifies the operation pattern to the additional function determining unit 13.

On the basis of the operation pattern detected by the centripetal force judging unit 12, the additional function determining unit 13 estimates a centripetal force, determines an additional function which corresponds to the centripetal force and desired by the user to be adjusted, and supplies additional function data of the determined additional function to the TV receiver 3.

Figure 3:
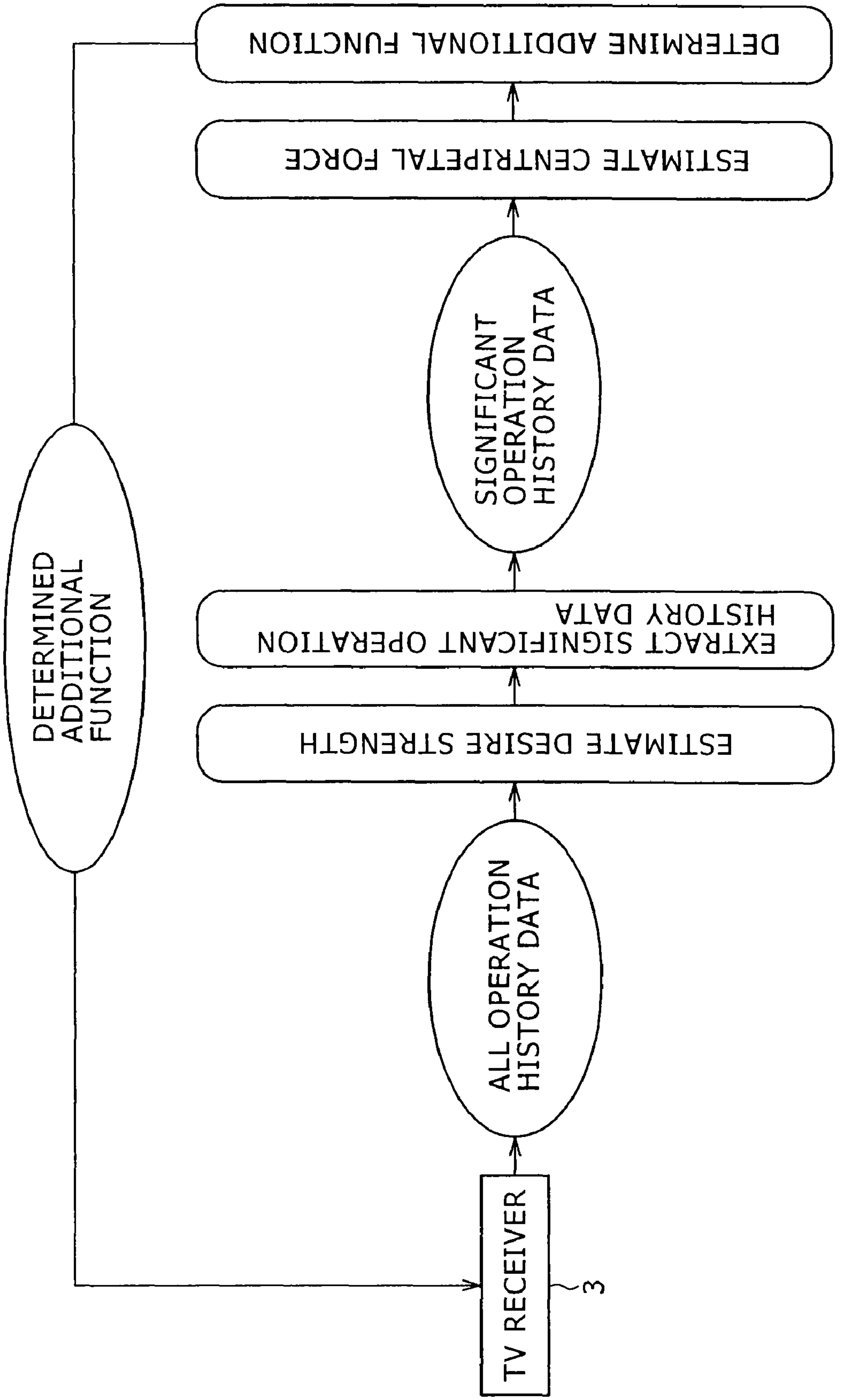
FIG. 3 is a diagram showing the outline of an additional function determining process to be performed by the information processing apparatus 2.
Figure 5:
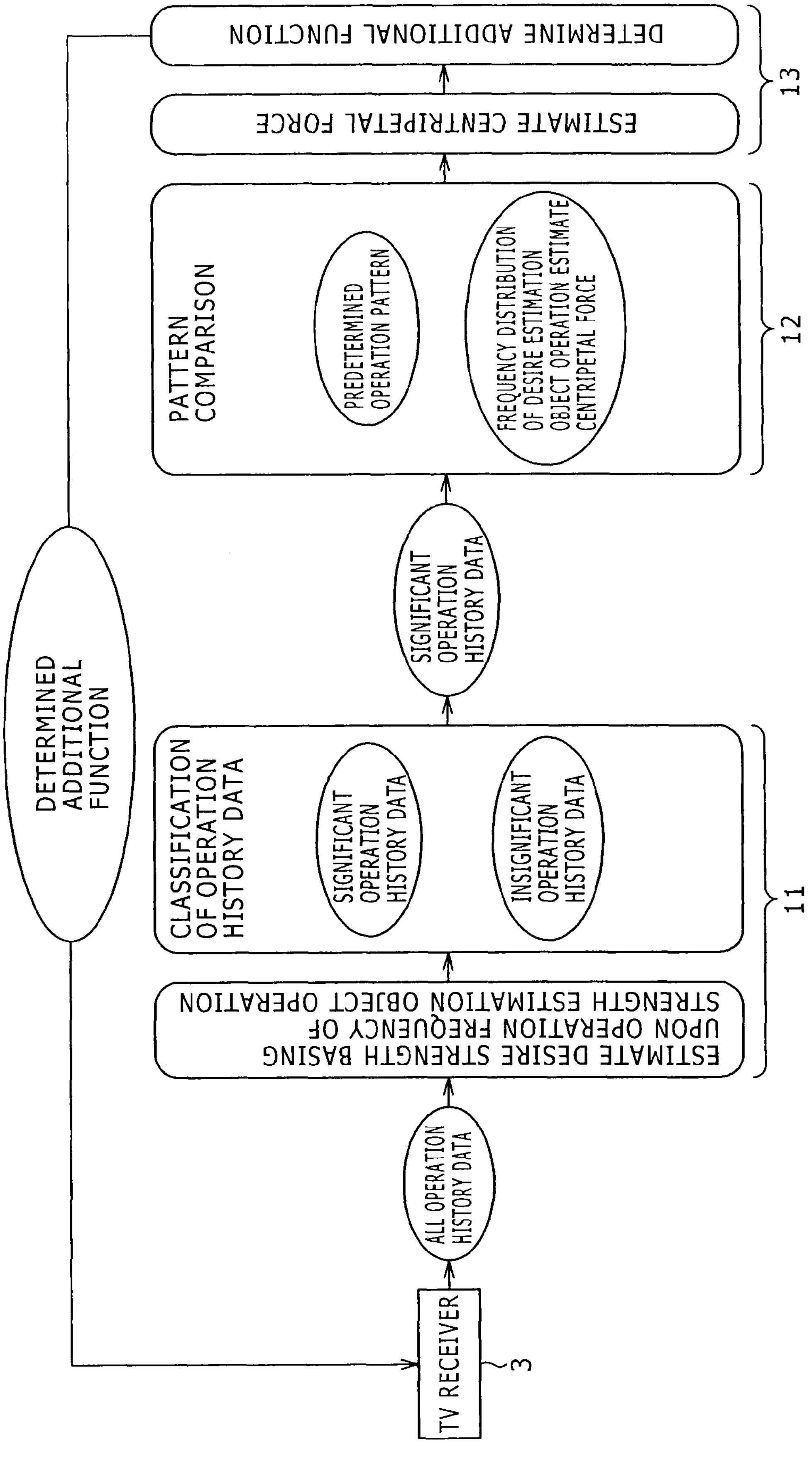
FIG. 5 is a diagram showing the outline of the additional function determining process to be performed by the information processing apparatus 2.

FIG. 5 illustrates functions of the operation history processing unit 11, centripetal force judging unit 12 and additional function determining unit 13 in correspondence with the functions shown in FIG. 3.

Next, description will be made on an example of the configuration of the operation history processing unit 11 (FIG. 2). The operation history processing unit 11 includes an operation history receiving unit 21, an operation history registering unit 22, an operation history database 23, a strength estimation object operation designating unit 24, a desire degree calculating unit 25, an operation history classifying unit 26, a classification operation history database 27, a frequency distribution generating unit 28, and a frequency distribution database 29.

The operation history receiving unit 21 receives operation history data supplied from the history information memory 10 of the substrate bay 1, and supplies the received operation history data to the operation history registering unit 22.

The operation history registering unit 22 supplies the operation history data supplied from the operation history receiving unit 21 to the operation history database 23.

The operation history database 23 includes a flash memory, a hard disk drive (HDD) or the like, and stores the operation history data supplied from the operation history registering unit 22 as it is.

The strength estimation object operation designating unit 24 designates a strength estimation object operation in response to an operation of an input unit (not shown), e.g., a key board, a mouse or the like) by an operator of the information processing apparatus 2.

The desire degree calculating unit 25 reads the operation history data of the strength estimation object operations notified from the strength estimation object operation designating unit 24, from the operation history database 23, and calculates, based on the read operation history data, an operation frequency (an adjustment desire degree for the strength estimation object function), for example, per day, of strength estimation object operations.

The operation history classifying unit 26 classifies significant operation history data and insignificant operation history data. The significant operation history data is operation history data of adjustment operations made on the day having the operation frequency of strength estimation object operations calculated by the desire degree calculating unit 25, in which the operation frequency exceeds a predetermined value. The insignificant operation history data is operation history data of adjustment operations made on other days. The operation history classifying unit 26 assigns, for example, classification numbers different between significant and insignificant data, reads, for example, an identification number of each operation history data from the operation history database 23, and supplies the identification number and classification number of each operation history data in one-to-one correspondence to the classification operation history database 27.

The classification operation history database 27 stores in one-to-one correspondence the identification number and classification number of each operation history data supplied from the operation history classifying unit 26.

The frequency distribution generating unit 28 refers to the classification operation history database 27, generates a history distribution of an operation frequency for each desire estimation object function based on the operation history data classified into the significant operation history data, and supplies the frequency distribution to the frequency distribution database 29.

The frequency distribution database 29 stores the frequency distribution supplied from the frequency distribution generating unit 28.

Next, the configuration of the centripetal force judging unit 12 will be described. The centripetal force judging unit 12 includes an operation pattern inputting unit 31, an operation pattern database 32, an operation pattern comparing unit 33, a centripetal force judging unit 34, and a frequency distribution outputting unit 35.

The operation pattern inputting unit 31 inputs an operation pattern corresponding to a predetermined centripetal force from, for example, an another information processing apparatus (not shown) operatively connected to the information processing apparatus 2, and supplies the input operation pattern to the operation pattern database 32.

The operation pattern database 32 brings the operation pattern supplied from the operation pattern inputting unit 31 into correspondence with, e.g., an identification number of the operation pattern, and then stores the operation pattern.

The operation pattern comparing unit 33 reads all operation patterns from the operation pattern database 32 and the frequency distribution from the frequency distribution database 29 of the operation history processing unit 11, and supplies the centripetal force judging unit 34 with comparison information (e.g., information indicating a correlation intensity between the frequency distribution and each operation pattern) representative of the comparison result between the frequency distribution and each operation pattern. For example, it is assumed that the comparison information contains an identification number of each operation pattern.

On the basis of the comparison information supplied from the operation pattern comparing unit 33, the centripetal force judging unit 34 detects an operation pattern near the frequency distribution (e.g., having a high correlation to the frequency distribution) read from the frequency distribution database 29. The centripetal force judging unit 34 supplies the additional function determining unit 43 of the additional function determining unit 13 with, for example, an identification number of the detected operation pattern. If an operation pattern corresponding to the frequency distribution read from the frequency distribution database 29 is not detected, the centripetal force judging unit 34 supplies the frequency distribution to the frequency distribution outputting unit 35.

When the frequency distribution is supplied from the centripetal force judging unit 34, the frequency distribution outputting unit 35 supplies the frequency distribution, for example, to the other information processing apparatus (not shown) operatively connected to the information processing apparatus 2.

Next, the configuration of the additional function determining unit 13 will be described. The additional function determining unit 13 includes an additional function data inputting unit 41, an additional function database 42, an additional function determining unit 43, and an additional function data outputting unit 44.

The additional function data inputting unit 41 inputs additional function data of a predetermined additional function capable of being added to the TV receiver 3 from, e.g., the other information processing apparatus (not shown) operatively connected to the information processing apparatus 2, and supplies the additional function data to the additional function database 42. For example, it is assumed that the additional function data to be inputted to the additional function data inputting unit 41 is made in correspondence with the operation pattern (its identification number) input to the operation pattern inputting unit 31.

The additional function database 42 stores the additional function data supplied from the additional function data inputting unit 41.

The additional function determining unit 43 refers to the additional function database 42, estimates a centripetal force using the operation pattern detected by the centripetal force judging unit 12, and determines a function corresponding to the centripetal force as an additional function. The additional function determining unit 43 reads additional function data of the determined additional function from the additional function database 42, and supplies the read additional function data to the additional function data outputting unit 44. The additional function determining unit 43 refers not only to the identification number of the operation pattern supplied from the centripetal force judging unit 34, but also properly, for example, to the operation history database 23, classification operation history database 27 or frequency distribution database 29 of the operation history processing unit 11, to determine the additional function suitable for being added to the TV receiver 3.

The additional function data outputting unit 44 supplies (provides) the additional function data supplied from the additional function determining unit 43 to the TV receiver 3.

Next, with reference to the flow charts shown in FIGS. 6 and 7, description will be made on the additional function determining process by the information processing apparatus 2 shown in FIG. 2.

The additional function determining process starts, for example, when the substrate bay 1 is mounted on the information processing apparatus 2 and operation history data stored in the history information memory 10 is supplied to the information processing apparatus 2.

In Step S1, the operation history receiving unit 21 of the operation history processing unit 11 receives the operation history data supplied from the substrate bay 1, and supplies the operation history data to the operation history registering unit 22.

In Step S2, the operation history registering unit 22 supplies the operation history data supplied from the operation history receiving unit 21 to the operation history database 23 to be stored therein.

In Step S3, the operation history receiving unit 21 judges whether all operation history data stored in the history information memory 10 of the substrate bay 1 have been inputted. If it is judged that there is operation history data which is not inputted yet, the process returns to Step S1 to repeat similar operations.

If it is judged in Step S3 that all operation history data stored in the history information memory 10 of the substrate bay 1 have been inputted, then in Step S4, the strength estimation object operation designating unit 24 designates a strength estimation object operation in response to an operation of an input unit (not shown) by an operator, and notifies the strength estimation object operation to the desire degree calculating unit 25.

In Step S5, the desire degree calculating unit 25 reads the operation history data of the strength estimation object operation notified from the strength estimation object operation designating unit 24 from the operation history database 23, and calculates, using the read operation history data, an operation frequency (an adjustment desire degree for the strength estimation object function), for example, per day, of strength estimation object operations.

In this example, as the strength estimation object function, for example, a Digital Reality Creation (DRC (which is a trademark))-Volume function (also called "pallet function") is used.

DRC is a technique of, for example, estimating a pixel value of a High Definition (HD) signal from a Standard Definition (SD) signal in converting the SD signal into the HD signal. According to this technique, for example, data of a class tap and an estimation tap is extracted from the SD signal, and a pixel value of the HD signal is obtained from a class coefficient of a class classified for the class tap and the estimation coefficient.

The pallet function is a function of generating the class coefficient of DRC according to adjustable image quality adjustment parameters (i.e., a (spatial) resolution and a noise elimination degree) (e.g., refer to Japanese Unexamined Patent Application Publication No. 2002-218414). The pallet function uses, a Graphical User Interface (GUI), and the resolution and noise elimination degree are set in response to an operation of an input unit (not shown) by the user.

Specifically, a pallet screen, including a two-dimensional graph having a resolution axis and a noise elimination degree axis and a cursor for pointing the resolution and noise elimination degree on this graph, is displayed on a display screen. The cursor moves in response to an operation of a cursor button of an input unit (not shown) by the user. The user operates the cursor button while viewing the display screen, so that the resolution and noise elimination degree can be set.

It is assumed that the adjustment operation (hereinafter called "pallet operation") for the pallet function includes an operation of a pallet button of an input unit (not shown) for turning on/off the pallet function and an operation of a cursor button while the pallet function is turned on. It is also assumed that a frequency of pallet operations is an operation frequency, for example, per hour in each day, of the pallet button (e.g., if the number of operations in a day is 12, the frequency of pallet operations is the number of operations (12 times) divided by hours (24 hours) of the day, i.e., 0.5 (=12/24)) multiplied by the frequency of operations, for example, per hour in each day, of the cursor button.

Figure 8:
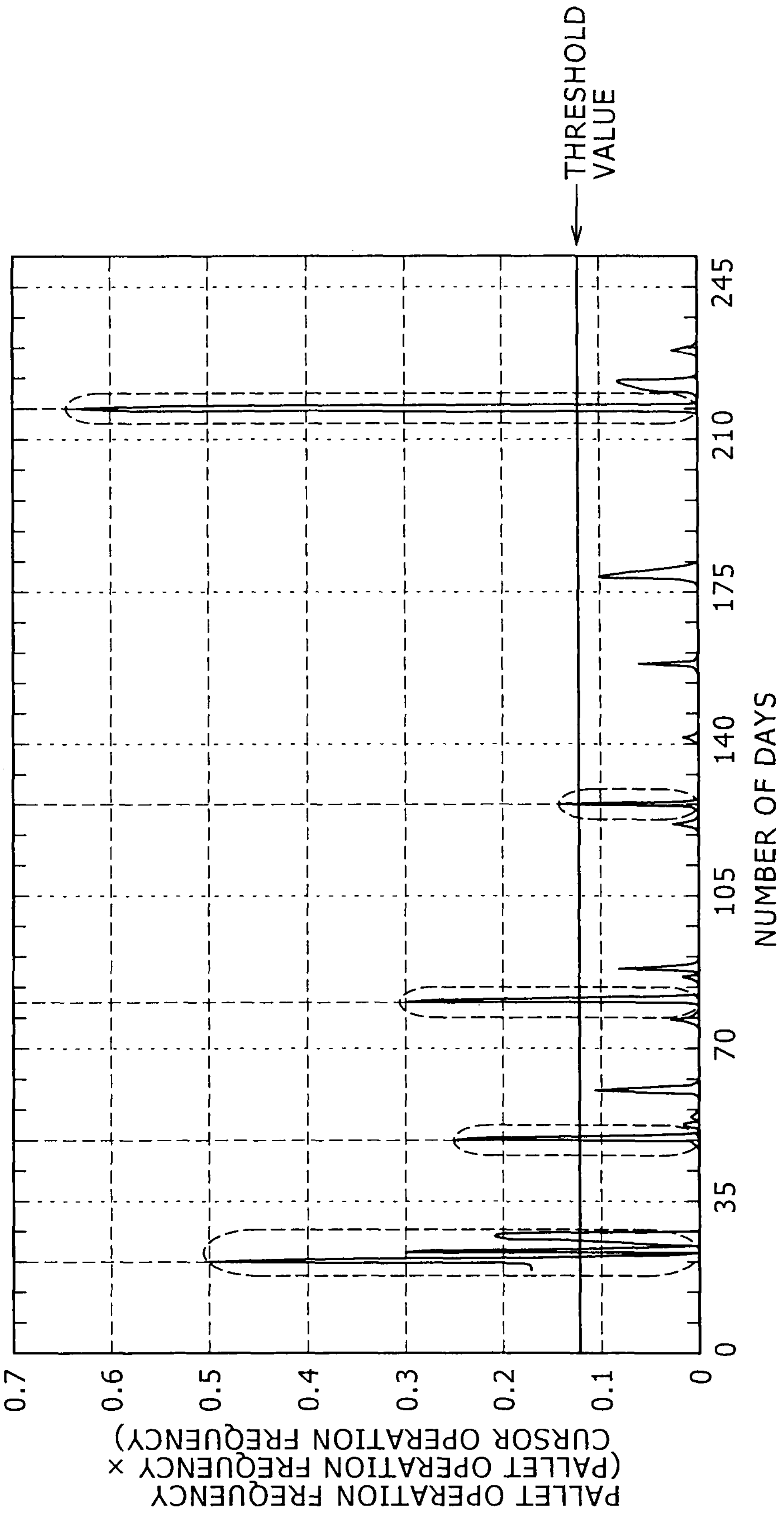
FIG. 8 is a diagram showing examples of a pallet operation frequency.

FIG. 8 shows examples of calculated frequencies of pallet operations. In FIG. 8, the frequencies of pallet operations of about 250 days are shown.

A TV receiver is commonly used passively. For example, a channel switching operation is possibly during viewing for a waste of time or zapping. In this case, even if the operation frequency is high, a user desire is not necessarily strong.

In contrast, the pallet function is not used during passive viewing. As shown in FIG. 8, if the operation frequency of pallet operations is high during some time period not routinely, it can be construed that some user adjustment desire for the pallet function becomes high during this time period.

In this example, by using the pallet operation as the strength estimation object operation, the adjustment desire for the pallet function is estimated.

Figure 6:
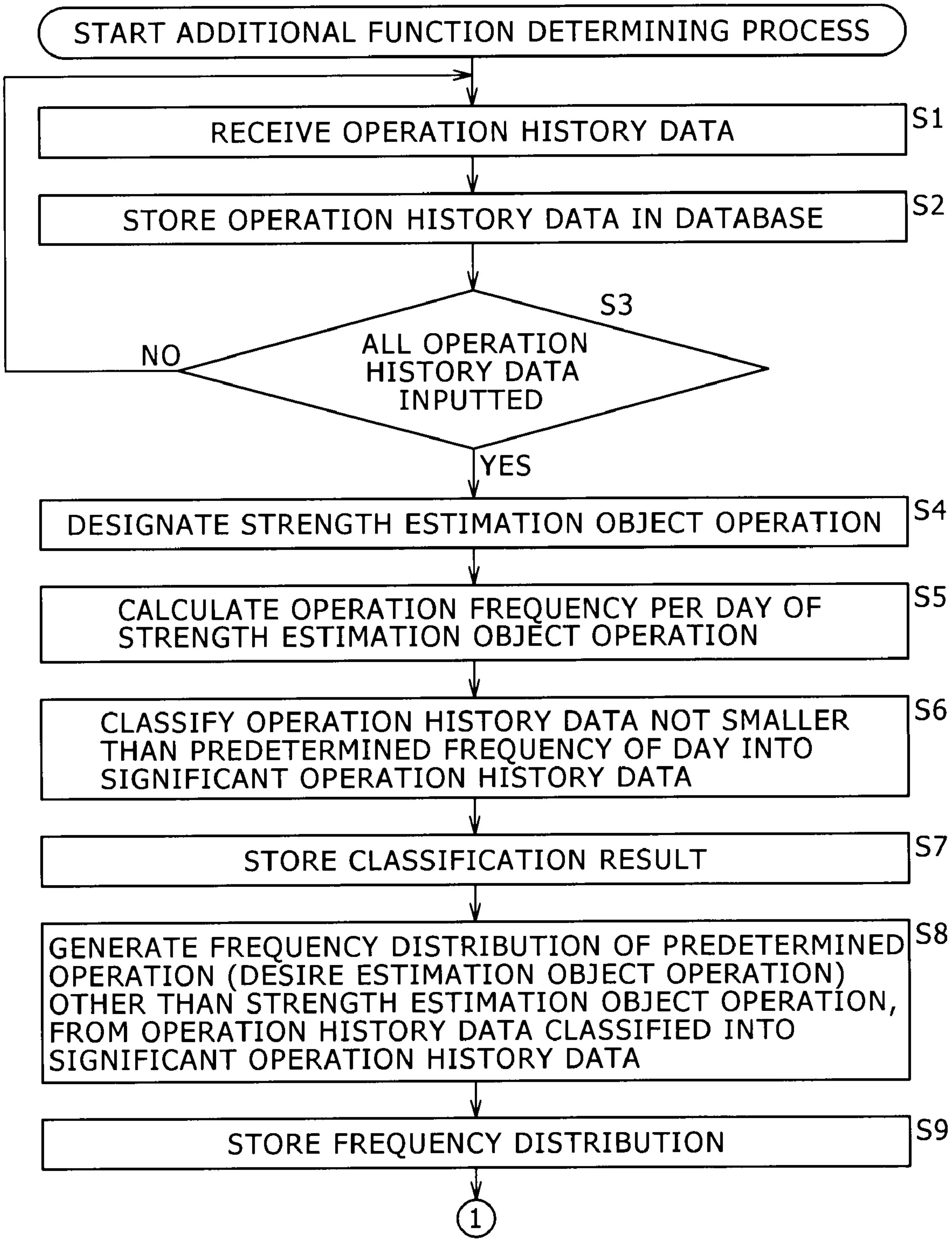
FIG. 6 is a flow chart illustrating the additional function determining process by the information processing apparatus 2.

Reverting to FIG. 6, in Step S6 the operation history classifying unit 26 classifies significant operation history data and insignificant operation history data. The significant operation history data is an operation history data of the adjustment operation made in some day at an operation frequency of the strength estimation object operation calculated by the desire degree calculating unit 25, in which the operation history exceeding a predetermined value. The insignificant operation history data is an operation history data of the adjustment operation made in other days.

For example, in the example of the pallet operation frequencies shown in FIG. 8, since a threshold value is set to 0.12, the operation history data of the adjustment operation (surrounded by a dot line in FIG. 8) made in the day at the operation frequency of the pallet operation equal to or larger than the threshold value, i.e., days of 19 to 21, 23, 25, 28, 49, 84, 126 and 217 are classified into the significant operation history data, and the operation history data of the adjustment operation made in other days are classified into the insignificant operation history data.

Figure 9:
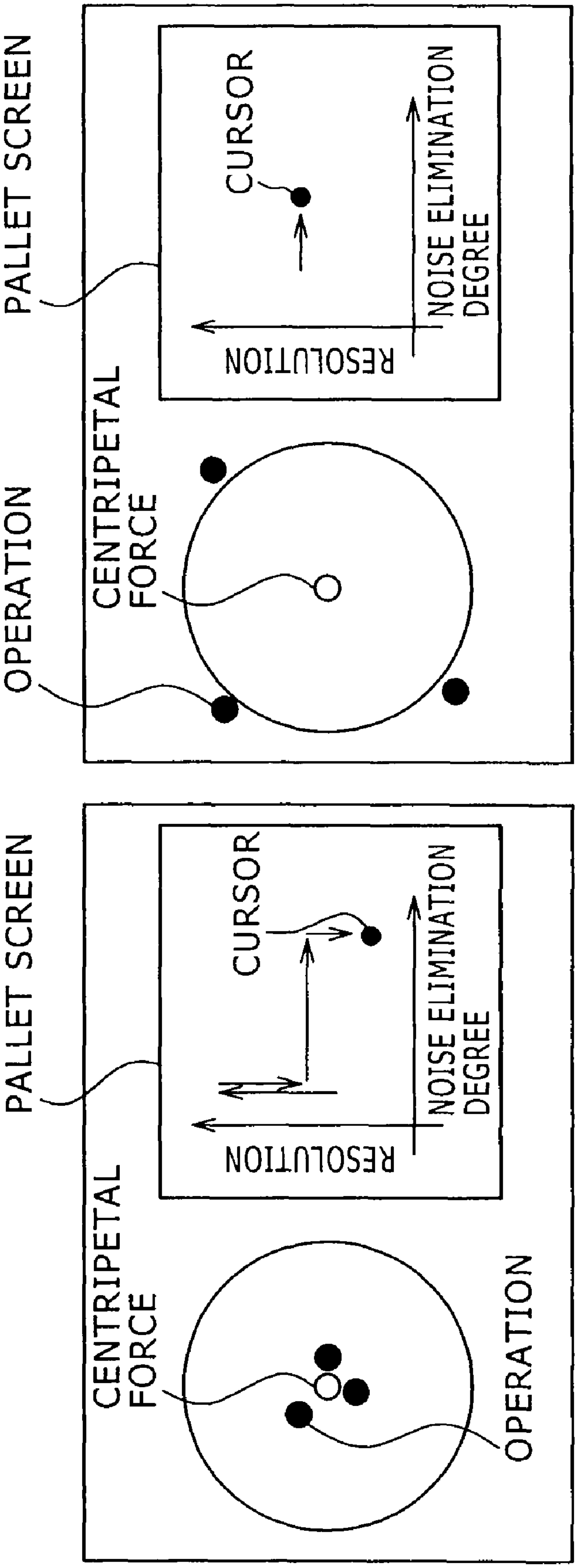
FIG. 9 is a diagram explaining the relation between a desire strength and a pallet cursor operation frequency.

For example, as shown in the left of FIG. 9, the adjustment operation made in the day when the cursor is repetitively moved on the pallet screen to repetitively change the resolution and noise elimination degree, i.e., made in the day when the pallet operation frequency is high, has a strong adjustment desire for the pallet function for the "centripetal force" schematically showing the relation to the "operation" similar to FIG. 4, i.e., is performed inside the circle. The operation history data of this adjustment operation is classified into the significant operation history data.

On the other hand, as shown in the right of FIG. 9, the adjustment operation made in the day when the cursor is not moved so much on the pallet screen and the pallet operation frequency is low (including an operation frequency of 0), has a weak adjustment desire for the pallet function for the "centripetal force" schematically showing the relation to the "operation" similar to FIG. 4, i.e., is performed outside the circle. The operation history data of this adjustment operation is classified into the insignificant operation history data.

Reverting to FIG. 6, at Step S7 the operation history classifying unit 26 supplies the results of the above-described classification, e.g., an identification number of each operation history data and a classification number indicating whether the operation history data is significant or insignificant operation history data made in one-to-one correspondence, to the classification operation history database 27 to be stored therein.

In Step S8 the frequency distribution generating unit 28 refers to the classification operation history database 27, and generates, based on the operation history data classified into the significant operation history data, a frequency distribution of operation frequencies, for example, per hour, of, for example, each desire estimation object function.

Figure 10:
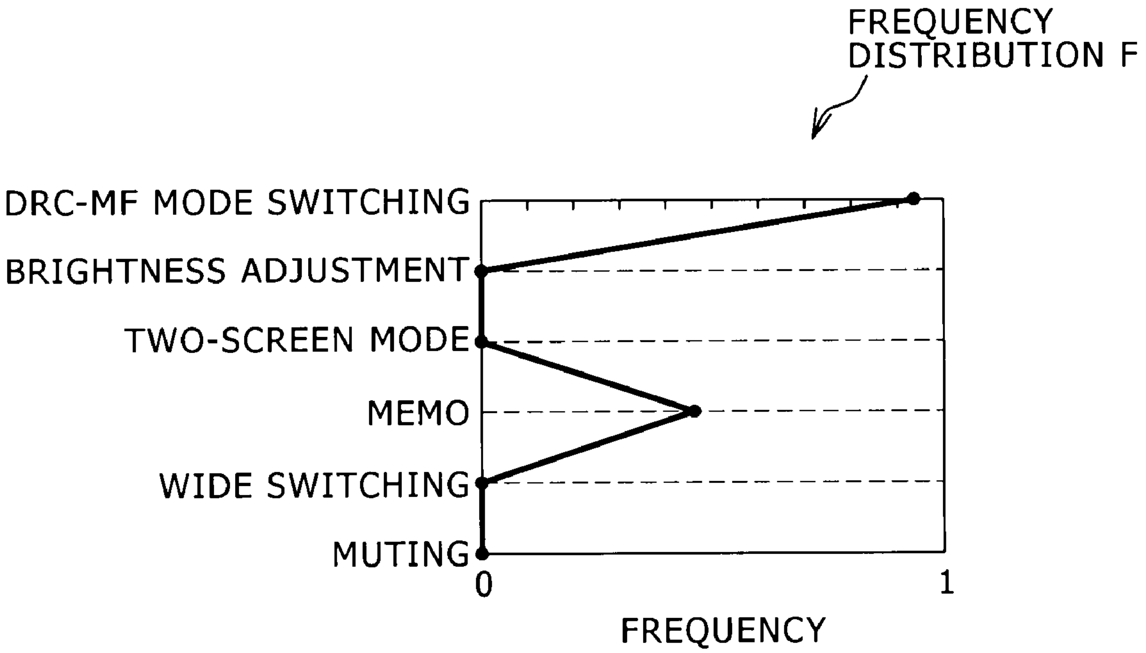
FIG. 10 is a diagram showing examples of a frequency distribution.

For example, on the basis of the operation history data classified into the significant operation history data (i.e., the operation history data of the adjustment operation for each desire estimation object function made in the day when the pallet operation frequency is high, such as "DRC-MF (Multi Function) mode switching", "brightness adjustment", "two-screen mode", "memo function", "wide switching" and "muting"), an operation frequency, for example, per hour, of each desire estimation object operation is obtained and a frequency distribution such as shown in FIG. 10 is generated.

The DRC-MF mode switching is one of the functions of DRC, and switches between interlace display DRC and progressive display DRC.

In the frequency distribution F shown in FIG. 10, the frequency of adjustment operations for the "DRC-MF mode switching" is 0.92, the frequency of adjustment operations for the "brightness setting" is 0, the frequency of adjustment operations for the "two-screen mode" is 0, the frequency of adjustment operations for the "memo" is 0.46, the frequency of adjustment operations for the "wide switching" is 0, and the frequency of adjustment operations for the "muting" is 0. Namely, in this example, when the pallet operation frequency is high, it can be said that the operation frequencies of adjustment operations are also high for the "DRC-MF mode switching" and "memo".

Reverting to FIG. 6, in Step S9, the frequency distribution generating unit 28 supplies the generated frequency distribution to the frequency distribution database 29 to be stored therein.

Figure 7:
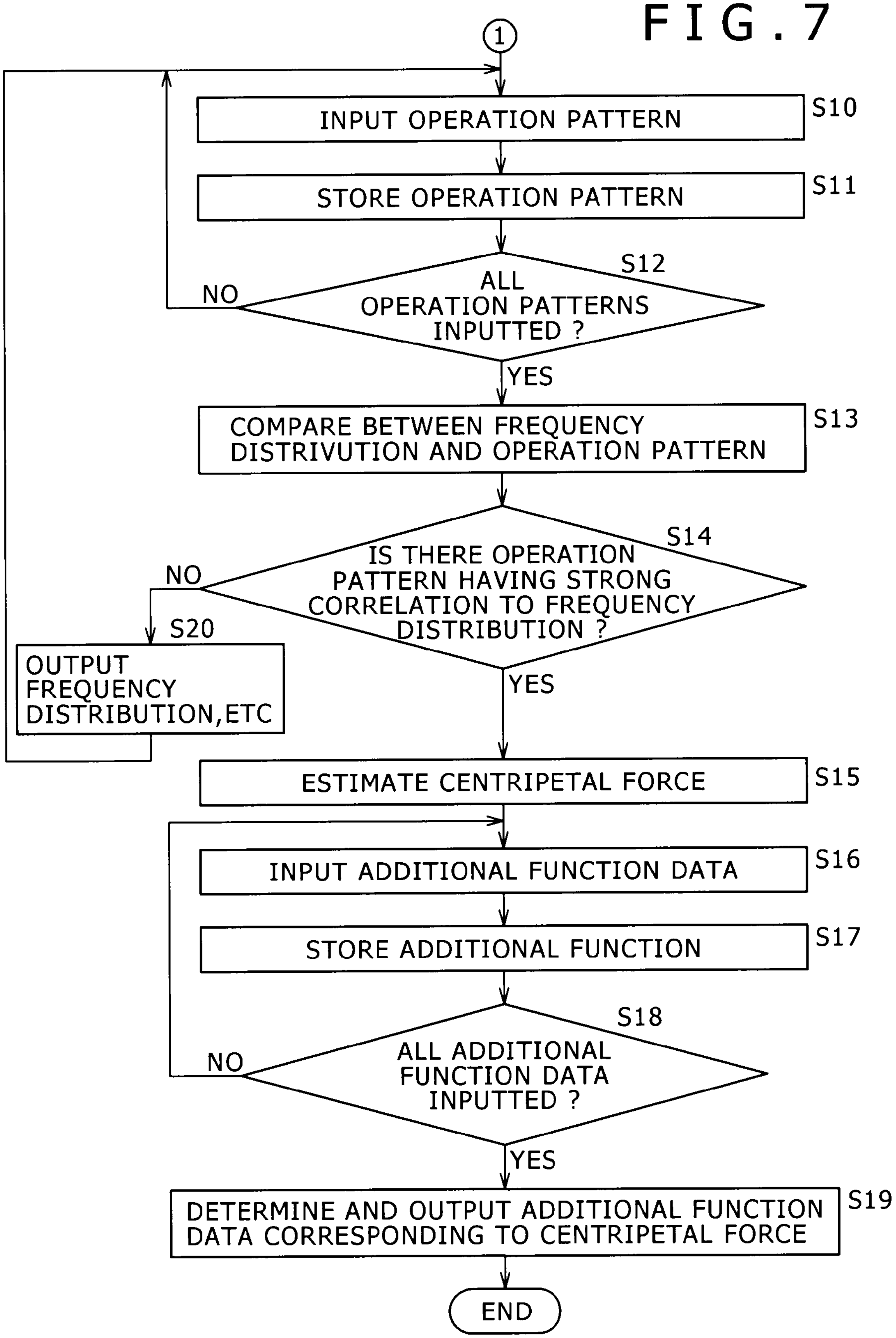
FIG. 7 is a flow chart illustrating the additional function determining process by the information processing apparatus 2.

In Step S10 shown in FIG. 7, the operation pattern inputting unit 31 of the centripetal force judging unit 12 inputs a predetermined operation pattern from, for example, an another information processing apparatus (not shown) operatively connected to the information processing apparatus 2, and supplies the operation pattern to the operation pattern database 32.

Figure 11:
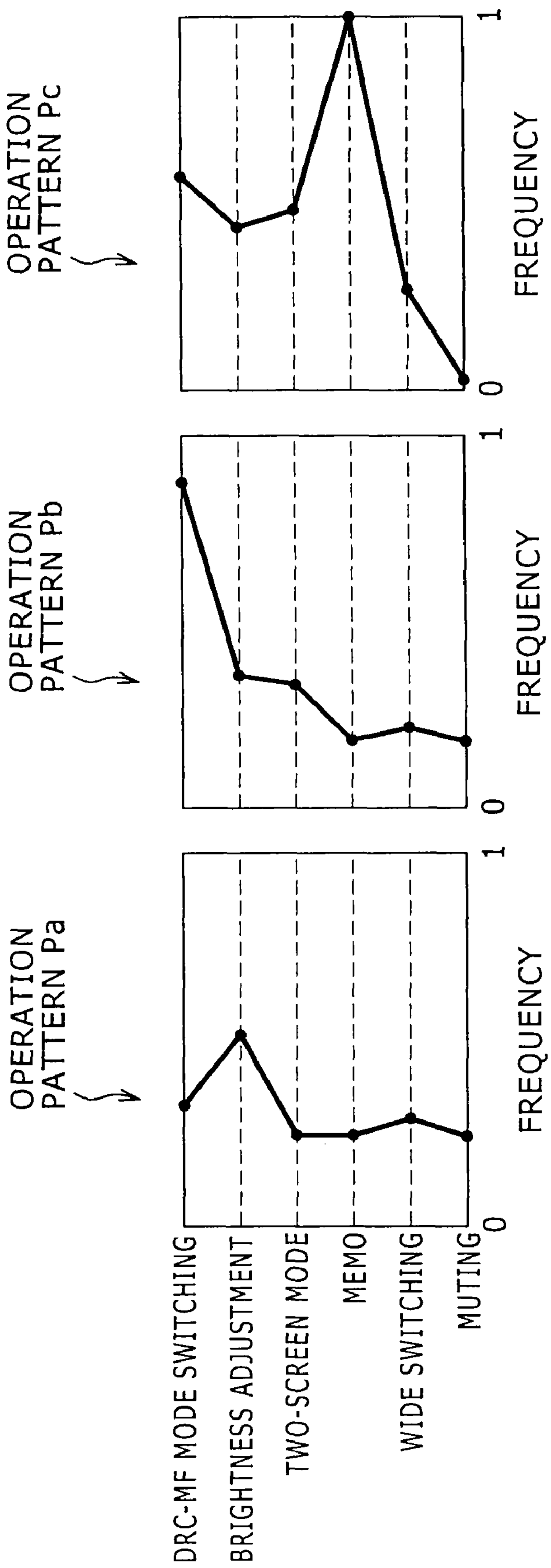
FIG. 11 is a diagram showing examples of an operation pattern.

For example, three types of operation patterns shown in FIG. 11 are inputted.

An operation pattern Pa shown at the leftmost in FIG. 11 has an operation frequency of adjustment operations not so high for any function, and corresponds to a centripetal force of "using the pallet function singly".

An operation pattern Pb shown at the second leftmost in FIG. 11 has a high operation frequency of adjustment operations for the "DRC-MF mode switching" and uses both the pallet function and a DRC-MF mode switching function. Namely, the operation pattern corresponds to a centripetal force of "using each function of DRC comprehensively".

An operation pattern Pc shown at the third leftmost in FIG. 11 has a high operation frequency of adjustment operations for the "DRC-MF mode switching", "brightness setting", "two-screen mode setting" and "memo", and uses a DRC-MF mode switching function, a brightness setting function, a two-screen mode setting function and a memo function along with the pallet function. Namely, the operation pattern corresponds to a centripetal force of "using whole functions regarding image processing comprehensively".

Reverting to FIG. 7, in Step S11, the operation pattern database 32 stores the operation pattern inputted from the operation pattern inputting unit 31, for example, in correspondence with an identification number of the operation pattern.

In Step S12, the operation pattern inputting unit 31 judges whether all operation patterns have been inputted. If it is judged that not all operation patterns have been inputted, the flow returns to Step S10 to repeat similar operations.

If it is judged in Step S12 that all operation patterns have been inputted, in Step S13, the operation pattern comparing unit 33 reads all the operation patterns from the operation pattern database 32 and the frequency distribution from the frequency distribution database 29 of the operation history processing unit 11, compares the read frequency distribution with each operation pattern, and supplies comparison information representative of the comparison results to the centripetal force judging unit 34.

For example, the operation pattern comparing unit 33 calculates, for example, a correlation coefficient between the operation patterns Pa, Pb, and Pc shown in FIG. 11 read from the operation pattern database 32 and the frequency distribution F shown in FIG. 10 read from the frequency distribution database 29. The centripetal force judging unit 34 is supplied with the comparison information representative of the comparison results such as a large correlation coefficient between the operation pattern Pa and frequency distribution F (high correlation between the operation pattern Pa and frequency distribution F) and a small correlation coefficient between the operation patterns Pb and Pc and frequency distribution F (low correlation between the operation patterns Pb and Pc and frequency distribution F).

In Step S14, the centripetal force judging unit 34 judges from the comparison information supplied from the operation pattern comparing unit 33 whether there is an operation pattern similar to the frequency distribution. Namely, it is judged whether a centripetal force is estimated.

If it is judged in Step S14 that there is an operation pattern having a high correlation to the frequency distribution (an operation pattern in correspondence with the frequency distribution), i.e., if a centripetal force is estimated, then in Step S15, the centripetal force judging unit 34 supplies an identification number of the operation pattern having a high correlation to the frequency distribution to the additional function determining unit 43 of the additional function determining unit 13, and the additional function determining unit 43 estimates a centripetal force based on the operation pattern.

For example, if the operation pattern having a high correlation to the frequency distribution is the operation pattern Pa shown in FIG. 11, the additional function determining unit 43 estimates a centripetal force of "using the pallet function singly".

If the operation pattern having a high correlation to the frequency distribution is the operation pattern Pb shown in FIG. 11, a centripetal force of "using each function of DRC comprehensively" is estimated.

If the operation pattern having a high correlation to the frequency distribution is the operation pattern Pc shown in FIG. 11, a centripetal force of "using whole functions regarding image processing comprehensively" is estimated.

In Step S16, the additional function data inputting unit 41 inputs the additional function data of a predetermined additional function capable of being added to the TV receiver 3 from, for example, an another information processing apparatus (not shown) operatively connected to the information processing apparatus 2, together with the identification number of the operation pattern corresponding to the additional function data, to the additional function database 42.

In Step S17, the additional function database 42 stores the additional function data input from the additional function data inputting unit 41.

In Step S18, the additional function data inputting unit 41 judges whether all additional function data have been inputted. If it is judged at Step S18 that all additional function data have not been inputted, the process returns to Step S16 to repeat similar processes.

If it is judged in Step S18 that all additional function data have been inputted, then in Step S19, the additional function determining unit 43 determines as an additional function the function corresponding to the centripetal force estimated in Step S15. The additional function determining unit 43 reads the additional function data of the determined additional function from the additional function database 42 and supplies (outputs) the additional function data to the TV receiver 3, and then the additional function determining process is terminated.

Figure 12:
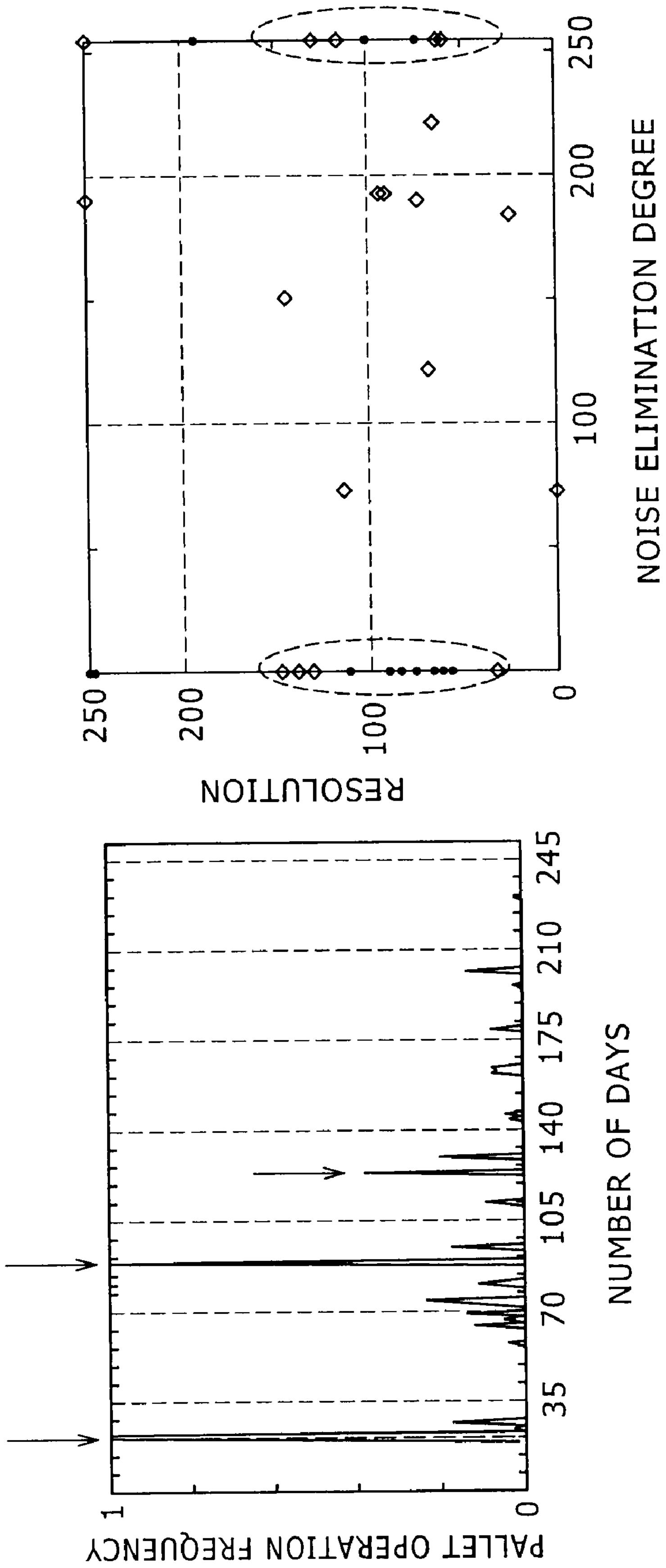
FIG. 12 is a diagram showing an example of distribution of setting values of a resolution and a noise elimination degree.

For example, if the centripetal force of "using the pallet function singly" is estimated in Step S15, and the operation pattern having a high correlation to the frequency distribution is the operation pattern Pa shown in FIG. 11, the additional function determining unit 43 refers to the classification operation history database 27, identifies the operation history data (operation history data classified into the significant operation history data) of the adjustment operation made in a day having a high pallet operation frequency such as shown at the left in FIG. 12, i.e., made in a day having a strong adjustment desire for the pallet function, reads the operation history data of the cursor operation during an on-time period of the pallet function from the operation history database 23, and determines the additional function using the read operation history data.

For example, as shown at the right in FIG. 12, of (noise elimination degree) setting values (white diamonds and black circles in FIG. 12) set by a cursor operation during an on-time period of the pallet function, the setting values in the day with a strong adjustment desire for the pallet function are concentrated near at the upper or lower limit of a settable range (0 to 255). It is therefore be considered that the user has a strong desire for making setting values in excess of the upper or lower limit of the settable range of the noise elimination degree. In this case, a pallet function capable of setting the noise elimination degree in a broader settable range is determined as the additional function.

This additional function supplies a high satisfaction to the user having the centripetal force of "using the pallet function singly" and having the above-described characteristics.

If the centripetal force of "using each function of DRC comprehensively" is estimated in Step S15, and the operation pattern having a high correlation to the frequency distribution is the operation pattern Pb shown in FIG. 11, it is considered that the user has a strong desire for pursuing a preferred image quality for each display mode, such as enjoying a fine image quality in interlace display with a resolution priority and enjoying an image quality in progressive display of less partial swing and flicker appearing in a still image having a number of characters and lines, with a noise elimination degree priority. By interpreting the feature of using comprehensively each function of DRC widely as the feature of using comprehensively each function of image quality setting, for example, the function of setting a plurality of functions of image quality setting with a simple operation is determined as the additional function.

Figure 13:
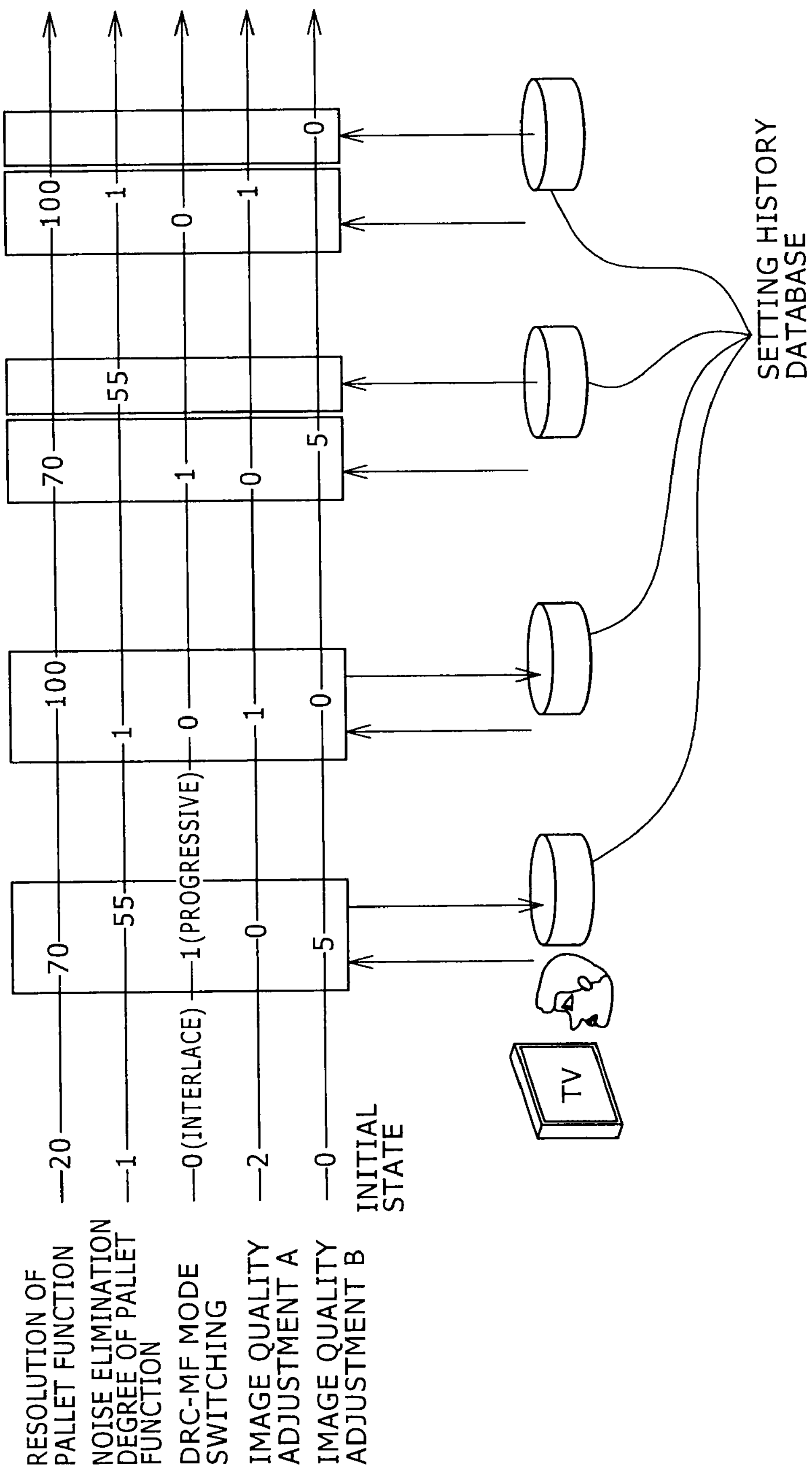
FIG. 13 is a diagram showing an example of a function of setting a plurality of functions concerning image quality setting.

This function will be described with reference to FIG. 13. As shown in FIG. 13, it is assumed that five setting values of the function of image quality setting are given initial values (20, 1, 0, 2, 0) as shown at the leftmost in FIG. 13. The five setting values include: a setting value (a value range of 1 to 100) of a resolution of the pallet function; a setting value (a value range of 1 to 100) of a noise elimination degree of the pallet function; a setting value ("0": interlace display, "1": progressive display) of DRC-MF mode switching; a setting value (a value range of 0 to 5) of image quality setting A; and a setting value (a value range of 0 to 5) of image quality setting B.

As shown in the second leftmost in FIG. 13, in accordance with a user instruction, it is assumed that the setting value of the resolution of the pallet function, the setting value of the noise elimination degree of the pallet function, the setting value of the DRC-MF mode switching, the setting value of image quality setting A and the setting value of image quality setting B are changed (set) to 70, 55, 1, 0 and 5, respectively. Thereafter, as shown in the third leftmost in FIG. 13, in accordance with a user instruction, it is assumed that the setting value of the resolution of the pallet function, the setting value of the noise elimination degree of the pallet function, the setting value of the DRC-MF mode switching, the setting value of image quality setting A and the setting value of image quality setting B are changed (set) to 100, 1, 0, 1, 0, respectively. Five setting values of the function of image quality setting are made in correspondence with each other each time change (set) is effected, and stored in an setting history database (not shown) of the TV receiver 3 as setting history data.

Thereafter, as shown at the fourth leftmost in FIG. 13, in accordance with a user instruction, the setting value of the resolution of the pallet function, the setting value of the noise elimination degree of the pallet function, the setting value of the DRC-MF mode switching, the setting value of image quality setting A and the setting value of image quality setting B are changed (set) to 70, - (no change), 1, 0, 5, respectively. In this case, the setting history database is referred to. If there is setting history data near a combination of these setting values, by utilizing this function, the setting history data (in this case, setting history data at the second leftmost in FIG. 13) is referred to. The setting value of the noise elimination degree of the pallet function not changed is interpolated (set) as 55 which is the setting value of the noise elimination degree of the pallet function of the referred setting history data.

Further, as shown at the fifth leftmost in FIG. 13, in accordance with a user instruction, the setting value of the resolution of the pallet function, the setting value of the noise elimination degree of the pallet function, the setting value of the DRC-MF mode switching, the setting value of image quality setting A and the setting value of image quality setting B are changed to 100, 1, 0, 1, - (no change), respectively. In this case, the setting history database is referred to. If there is setting history data near a combination of these setting values, by using this function, the setting history data (in this case, setting history data at the third leftmost in FIG. 13) is referred to. The setting value of the noise elimination degree of the pallet function not changed is interpolated (set) as 0 which is the setting value of the noise elimination degree of the pallet function of the referred setting history data.

An additional function for interpolation of some setting values in the setting history data to be considered not changed as opposed to a user intention is added. By utilizing this function, a user comprehensively using each function of DRC and characterized in setting a plurality of functions of image quality setting is not required, for example, to memorize correctly all preferred setting value of a plurality of functions, thereby improving the convenience of the user.

With this function, if most of setting values (hereinafter called "user setting values") set in accordance with a user instruction are perfectly coincident with the setting values (hereinafter called "history setting values") of the setting history data, interpolation (setting) is performed for the setting value not changed. Alternatively, if most of user setting values are coincident with the history setting values in an allowable range, interpolation (setting) may also be performed for the setting value not changed.

For example, if the settable range is relatively broad, e.g., 0 to 100 as in the case of the resolution and noise elimination degree of the pallet function, it is rather rare that the user setting values become perfectly coincident with the history setting values. Therefore, an allowable range of a difference between the user setting value and history setting value is set to, for example, 10 or smaller. If the user setting value is coincident with the history setting value in this allowable range, interpolation (setting) is performed for the setting value not changed.

With this function, the setting value not changed is automatically changed without any direct instruction from a user. This is not permitted by all persons. Accordingly, this additional function should be provided only to a user comprehensively using each function of DRC. The user of this type shows a high satisfaction of this additional function.

If the operation pattern having a high correlation to the frequency distribution is the operation pattern Pc shown in FIG. 11, and the centripetal force of "using whole functions of image processing comprehensively" is estimated in Step S15, it is considered that the user is unhappy with the image quality setting, for example, and has a strong desire for thoroughly performing image quality setting by using both the pallet function and memo function while viewing not a moving image but a still image. In this case, for example, a function of the pallet function including the memory function is determined as the additional function.

The memo function is a function of fixing an image displayed on a display screen (not shown) of the TV receiver 3 to a frame.

This function will be described with reference to FIG. 14. As shown at the first row of FIG. 14, the TV receiver 3 sequentially displays received frames (e.g., (n+1)-th to (n+6)-th frames).

Figure 14:
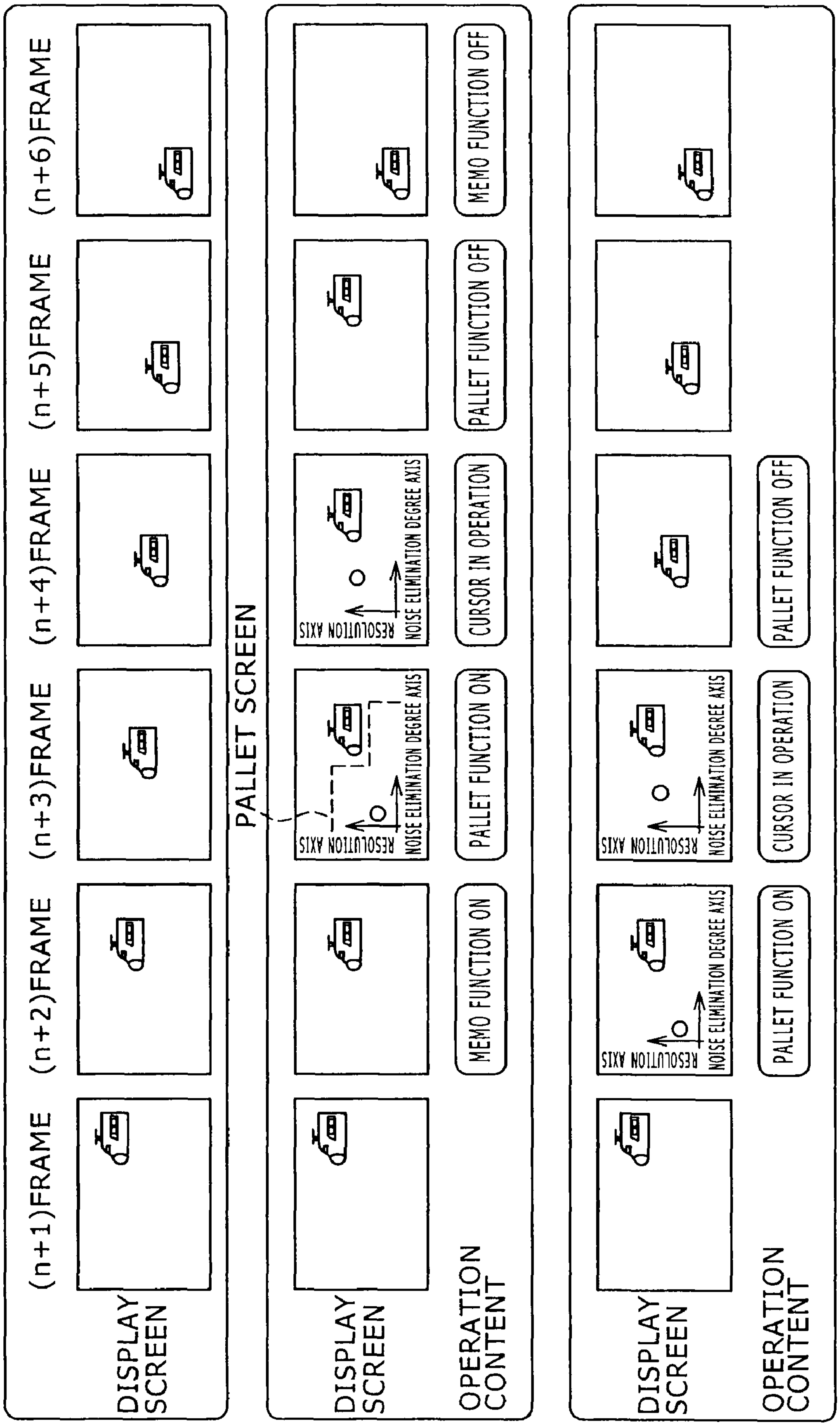
FIG. 14 is a diagram explaining an example of a function of utilizing both a pallet function and a memo function.

In the case of using both the memo function and pallet function, as shown at the second row of FIG. 14, for example, when the memo function is turned on at the (n+2)-th frame responsive to an operation of a memo button of an input unit (not shown) by a user, an image to be displayed on the display screen is fixed to the image of the (n+2)-th frame. When the pallet function is turned on at the (n+3)-frame responsive to an operation of the pallet button by the user, the TV receiver 3 displays a pallet screen superposed upon the image (same as the image at the (n+2)-th frame) while displaying.

At the (n+4)-th frame, the TV receiver 3 moves the cursor on the pallet screen in accordance with an operation (cursor operation) of the cursor button by the user, and sets the resolution and noise elimination degree so as to correspond to those at the position of the moved cursor. At the (n+5)-th frame, as the pallet function is turned off in accordance with the operation of the pallet button by the user, the TV receiver 3 erases only the pallet screen. At the (n+6)-th frame, when the memory function is turned off responsive to the operation of the memo button by the user, the TV receiver 3 displays the received image at the (n+6)-th frame. In the following frames, received frames are sequentially displayed.

A user using both the memo function and pallet function frequently feels cumbersome to operate these two functions separately. Consequently, for example, the function of the memo function containing the pallet function is determined as the additional function.

With this function, as shown at the third row of FIG. 14, for example, at the (n+2) frame, the TV receiver 3 turns on the pallet function in response to the operation of the pallet button by the user, and displays the pallet screen superposed upon the image at the (n+2)-th frame while displaying. The TV receiver 3 turns on the memory function in synchronization with turning on the pallet function, and fixes the image displayed on the display screen to the image at the (n+2)-th frame under display.

At the (n+3)-th frame, the TV receiver 3 moves the cursor on the pallet screen responsive to an operation (cursor operation) of the cursor button by the user, and sets the resolution and noise elimination degree so as to correspond to those at the position of the moved cursor. At the (n+4)-th frame, the TV receiver 3 turns off the pallet function responsive to the operation of the pallet button by the user, and erases only the pallet screen. As the memo function is turned on in response to turning off the pallet function, the received image at the (n+4)-th frame is displayed. At the (n+5)-th frame and following frames, the received frames are sequentially displayed.

By making the pallet function be contained in the memo function, for example, a user having a characteristic of using both the pallet function and memo function can turn on or off the memo function only be turning on or off the pallet function. It is therefore possible to implement an object function by a simple operation.

With this function, for example, the memo function is automatically turned on or off without any direct instruction from a user. This is not permitted by all persons. Consequently, this additional function should be provided only to a user comprehensively using whole functions of image processing. The user of this type shows a high satisfaction of this additional function.

If the function corresponding to the centripetal force estimated in Step S15 is determined as the additional function, the additional function determining unit 43 reads the additional function data necessary for performing the function from the additional function database 42, and supplies the additional function data to the additional function data outputting unit 44. The additional function data outputting unit 44 supplies the additional function data supplied from the additional function determining unit 43 to the TV receiver 3.

Reverting to FIG. 7, in Step S14, if the centripetal force determining unit 34 judges, from the comparison information supplied from the operation pattern comparing unit 33, that there is no operation pattern near the frequency distribution in the frequency distribution database 29, then in Step S20, the centripetal force judging unit 34 supplies the frequency distribution and the like, for example, to another information processing apparatus operatively connected to the information processing apparatus 2 via the frequency distribution outputting unit 35, to thereafter return to Step S10 to repeat similar processes.

A frequency distribution for which the operation pattern near the frequency distribution is not detected is out of consideration. In this case, it is difficult to estimate the centripetal force and to determine the additional function to be added to the TV receiver 3.

In this case, an operator may determine a new operation pattern near the frequency distribution and the identification number, by performing an off-line analysis work by using another information processing apparatus and information on the frequency distribution and the like supplied from the information processing apparatus 2 in Step S20. The operation pattern determined in this manner may be inputted from the operation pattern inputting unit 31, for example, in Step S10.

As described above, the information processing apparatus 2 calculates an operation frequency per a predetermined time period of adjustment operations for the strength estimation function from the operation history data of the adjustment operation for the functions of the TV receiver 3, estimates a time period with the operation frequency of a predetermined value or larger as a time period over which the user has a strong desire to adjust. Of the operation history data, the operation history data (significant operation history data) during the time period corresponding to the time period of the strong desire to adjust is used for the information processing apparatus to calculate frequency distribution of operation frequency of each desire estimation object function. The information processing apparatus detects features (operation patterns and the like) of the adjustment operations by a user for the TV receiver 3, the features corresponding to the operation frequency of each desire estimation object function. The additional function desired for the user to adjust and corresponding to the detected features is determined. It is therefore possible to determine and provide an additional function matching a user in depth.

Next, with reference to FIG. 15, description will be made on another example of the configuration of the information processing apparatus 2.

Figure 15:
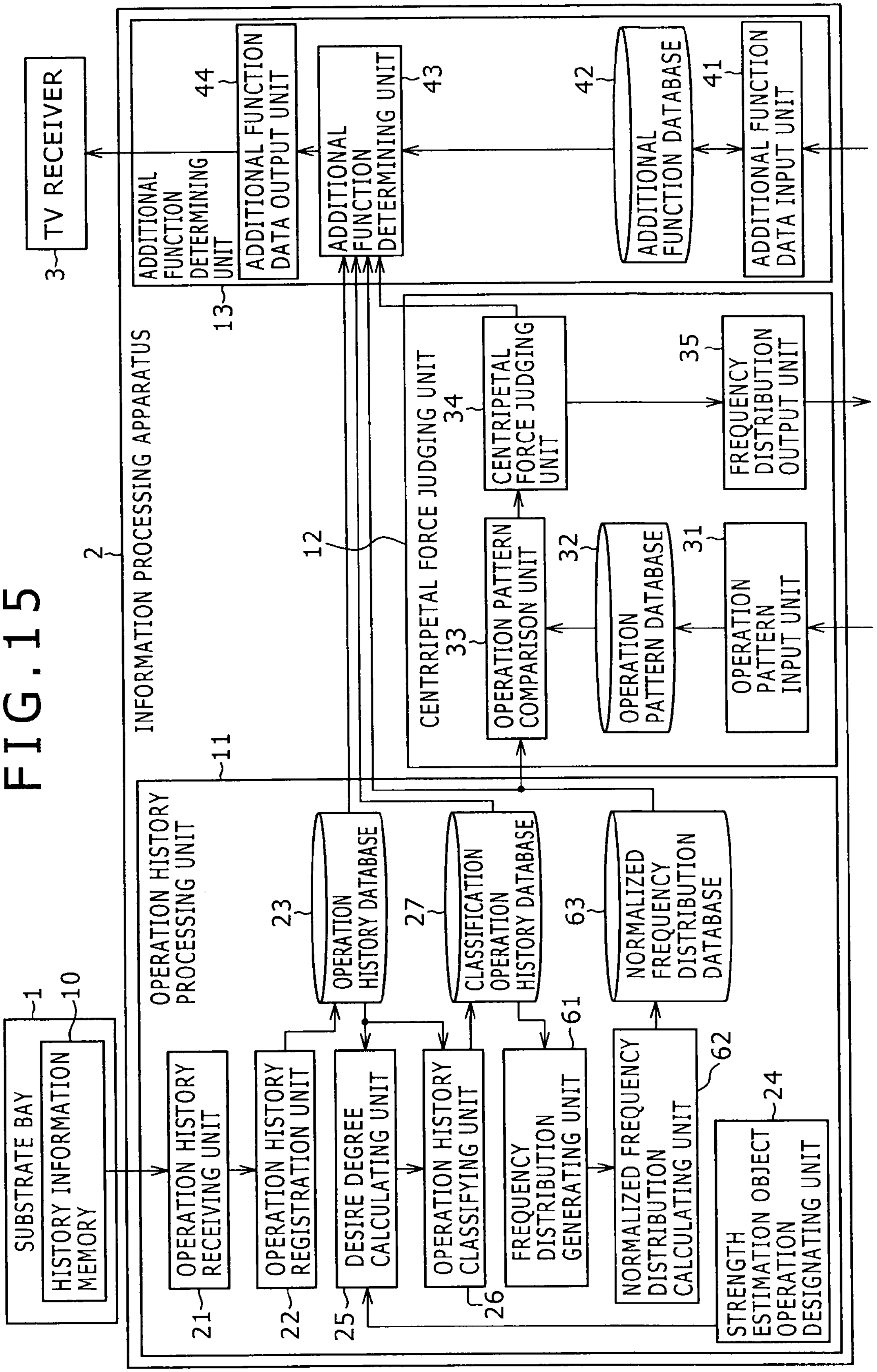
FIG. 15 is a block diagram showing another example of the structure of the information processing apparatus 2.

In FIG. 15, elements (components) corresponding to those shown in FIG. 2 are represented by identical reference numerals, and the description thereof is omitted where appropriate. An operation history processing unit 11 of an information processing apparatus 2 shown in FIG. 15 has a frequency distribution generating unit 61 to a normalized frequency distribution database 63, in place of the frequency distribution generating unit 28 and frequency distribution database 29 shown in FIG. 2.

The operation history processing unit 11 shown in FIG. 2 calculates a frequency distribution of operation frequencies of each desire estimation object function for significant operation history data, whereas the operation history processing unit 11 shown in FIG. 15 calculates a first frequency distribution (same as that just described above) of operation frequencies of each desire estimation object function for significant operation history data, further calculates a second frequency distribution of operation frequencies of each desire estimation object function for insignificant operation history data, and conducts normalization by subtracting from the operation frequency of the first frequency distribution the operation frequency of adjustment operations for the same function.

The frequency distribution generating unit 61 refers to the classification operation history database 27, generates the first frequency distribution of the operation frequency of each desire estimation object function for the operation history data classified into the significant operation history data (operation history data about which the user has a strong desire to adjust), generates the second frequency distribution of the operation frequency of each desire estimation object function for the operation history data classified into the insignificant operation history data (operation history data about which the user has a weak desire to adjust), and supplies the first and second frequency distributions to a normalized frequency distribution calculating unit 62.

Figure 16:
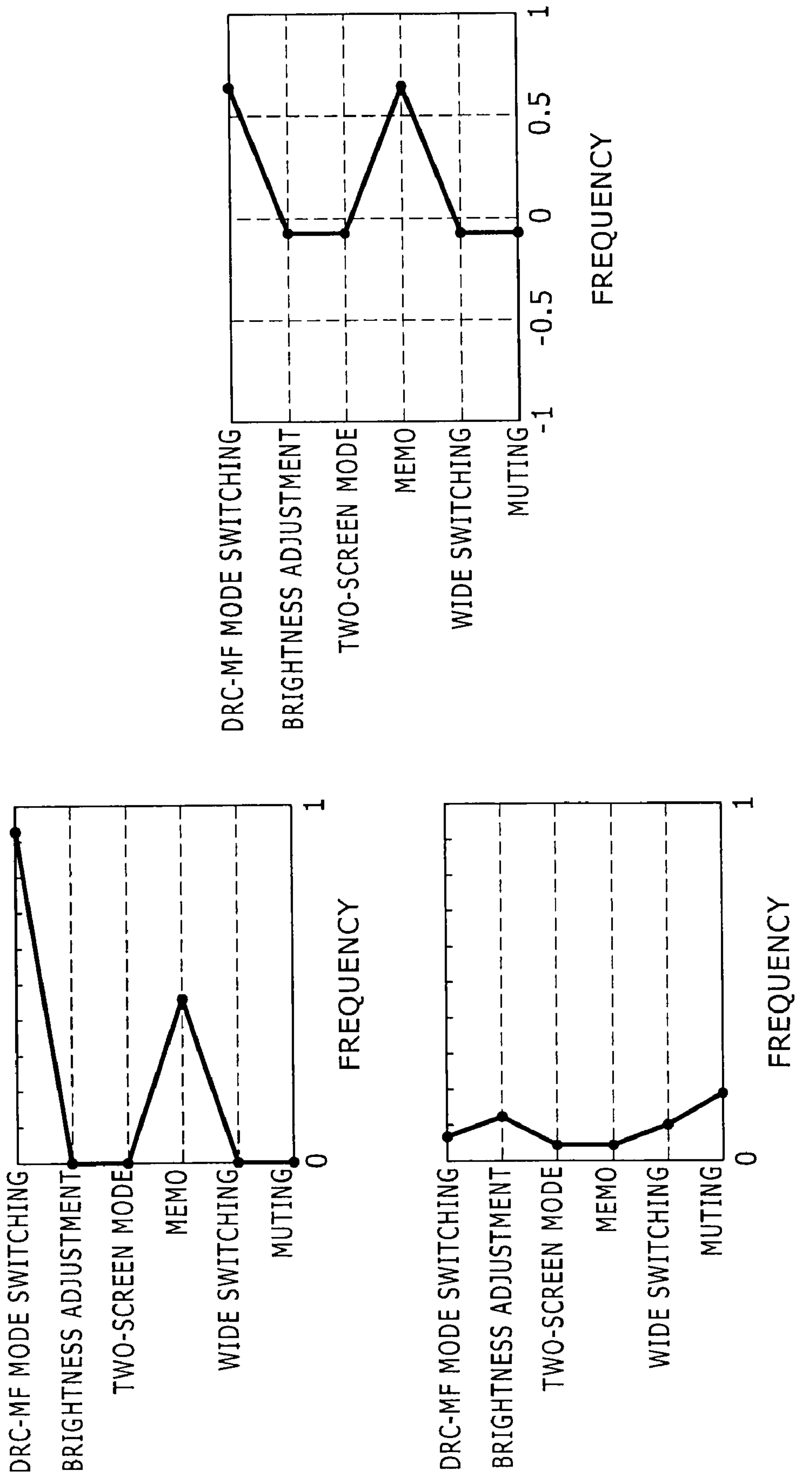
FIG. 16 is a diagram showing a first frequency distribution, a second frequency distribution and a normalized frequency distribution.

For example, if the strength estimation object function is set to the pallet function, obtained are an operation frequency, for example, per hour, of the desire estimation object function (e.g., "DRC-MF mode switching", "brightness setting", "two-screen mode", "memory", "wide switching", and "muting") for the significant operation history data, i.e., the operation history data in the strong user adjustment desire day for the pallet function, and an operation frequency, for example, per hour, of the desire estimation object function for the insignificant operation history data, i.e., the operation history data about which the user has a weak desire to adjust for the pallet function, to thereby generate the second frequency distribution such as shown at the lower left in FIG. 16.

In the first frequency distribution shown at the upper left in FIG. 16, an operation frequency (of adjustment operations) for the "DRC-MF mode switching" is 0.92, an operation frequency for the "brightness setting" is 0, an operation frequency for the "two-screen mode" is 0, an operation frequency for the "memo" is 0.46, an operation frequency for the "wide switching" is 0, and an operation frequency for the "muting" is 0. In the second frequency distribution shown at the lower left in FIG. 16, an operation frequency for the "DRC-MF mode switching" is 0.07, an operation frequency for the "brightness setting" is 0.12, an operation frequency for the "two-screen mode" is 0.04, an operation frequency for the "memo" is 0.04, an operation frequency for the "wide switching" is 0.10, and an operation frequency for the "muting" is 0.18. In this example, it can be said that when the operation frequency of pallet operations is large, the operation frequencies for the "DRC-MF mode switching" and "memo" are also large. Thus, when the operation frequency of pallet operations is small, the operation frequency for each function becomes small.

According to the first and second frequency distributions, the normalized frequency distribution calculating unit 62 generates a normalized frequency distribution by subtracting from the operation frequency of the first frequency distribution the operation frequency of adjustment operations for the same function, and supplies the normalized frequency distribution to the normalized frequency distribution database 63. The normalized frequency distribution database 63 stores the normalized frequency distribution supplied from the normalized frequency distribution calculating unit 62. An operation pattern comparing unit 33 reads the normalized frequency distribution from the normalized frequency distribution database 63 instead of the frequency distribution.

For example, the normalized frequency distribution shown at the right in FIG. 16 is generated by subtracting from the operation frequency of the first frequency distribution shown at the upper left in FIG. 16 the operation frequency of adjustment operations for the same function. At the right in FIG. 16, the normalized frequency distribution is generated in which the normalized operation frequencies of the "DRC-MF mode switching", "brightness setting", "two-screen mode", "memo", "wide switching", and "muting" are 0.85, −0.12, −0.04, 0.42, −0.10 and −0.18, respectively.

For example, even if a user performs the channel switching operation (adjustment operation for the channel switching function) 100 times per day, a weight of the operation frequency of adjustment operations for the function becomes quite different depending upon whether the user frequently performs the channel switching operation frequently or not at all in ordinary days.

In the example shown in FIG. 16, the operation frequency of the first frequency distribution of the operation frequency of each desire estimation object function (e.g., "DRC-MF mode switching", "brightness setting", "two-screen mode", "memory", "wide switching", and "muting") in the day of a large operation frequency of adjustment operations for the pallet function is subtracted by the operation frequency of adjustment operations for the same function in the day of a small operation frequency of adjustment operations for the pallet function, so that a difference of weights of operation frequencies different for each user can be eliminated.

In the above description, although a function other than the strength estimation object function is used as the desire estimation object function, other functions including a strength estimation object function may be used.

The function used as the desire estimation object function is not limited to the above-described functions ("DRC-MF mode switching", "brightness setting", "two-screen mode", "memory", "wide switching", and "muting").

In the logger system described above, although the TV receiver 3 having the built-in substrate bay 1 is used as the electronic apparatus to be added with an additional function, a TV receiver other than the TV receiver 3 may also be used.

Although a series of processes described above may be performed by hardware, they may be performed by software. If a series of processes are to be performed by software, the program constituting the software is installed from a program recording medium in a computer having dedicated hardware assembled therein, or, for example, in a general personal computer capable of executing various functions by installing various programs.

Figure 17:
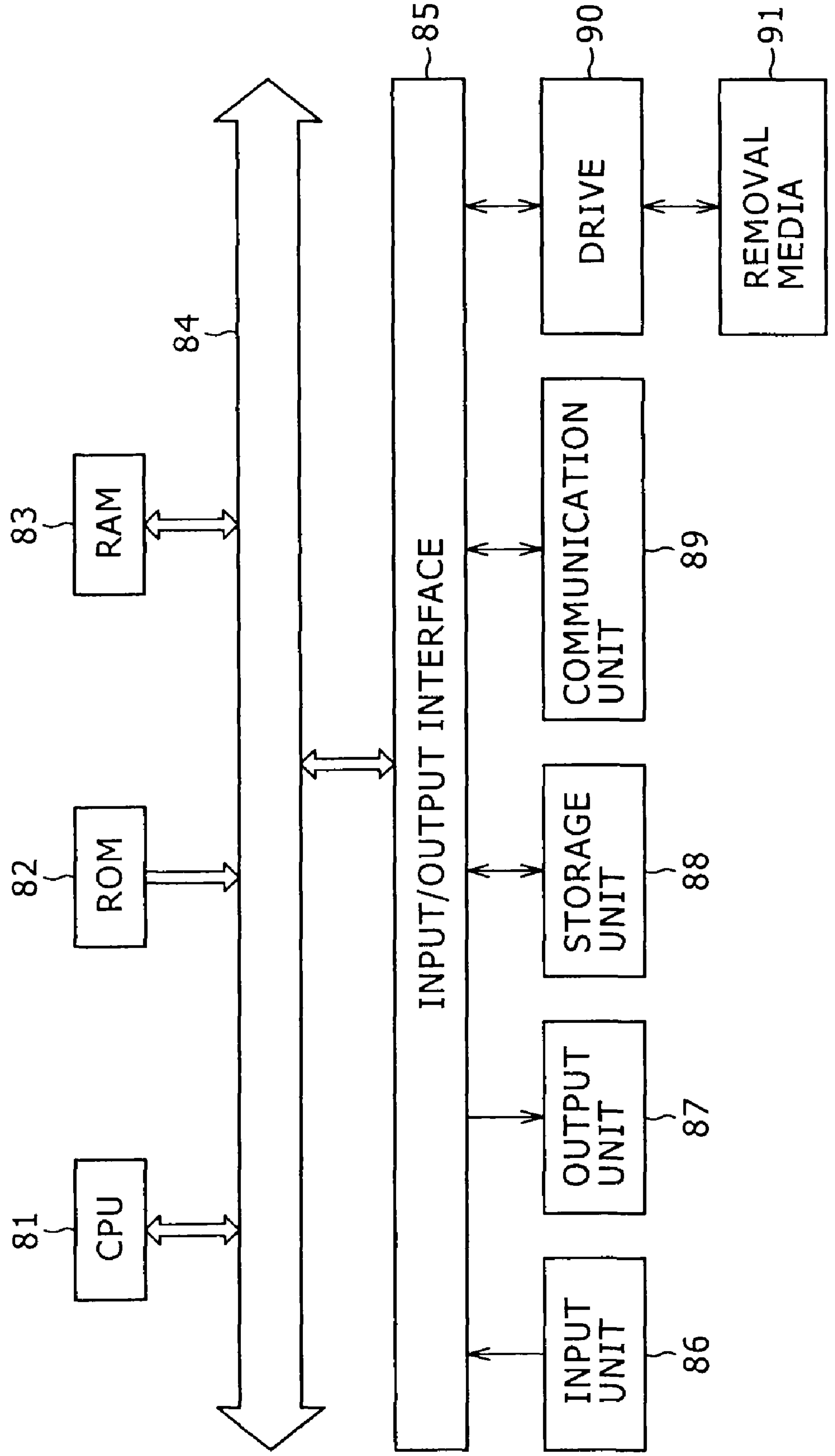
FIG. 17 is a block diagram showing an example of the structure of hardware of a computer adopting the present invention.

FIG. 17 is a block diagram showing the hardware configuration of a computer for executing the above-described series of processes.

In the computer, a Central Processing unit (CPU) 81, a Read Only Memory (ROM) 82, and a Random Access Memory (RAM) 83 are interconnected by a bus 84.

An input/output interface 85 is also connected to the bus 85. The input/output interface 85 is coupled to an input unit 86 composed of a keyboard, a mouse, a microphone and the like, an output unit 87 composed of a display, a speaker and the like, a storage unit 88 composed of a hard disk, a nonvolatile memory and the like, a communication unit 89 composed of a network interface and the like, and a drive 90 for driving a removable medium such as a magnetic disc, an optical disc, a magnetic optical disc and a semiconductor memory.

In the computer constructed as described above, the series of processes are executed in such a manner that, for example, CPU 81 loads and executes the program stored in the storage unit 88 in RAM 83 via the input/output interface 85 and bus 84.

The program to be executed by the computer (CPU 81) is provided as package media or removable media 91 such as a magnetic disk, an optical disc (such as Compact Disc-Read Only Memory (CD-ROM) and Digital Versatile Disc (DVD), a magnetic optical disc and a semiconductor memory, or provided via wired or radio transmission media such as a local area network, the Internet and a digital satellite broadcasting.

The program can be installed in the storage unit 88 via the input/output interface 85, by mounting the removable medium 91 on the drive 90. The program may also be installed in the storage unit 88 by receiving it at the communication unit 89 via the wired or radio transmission medium. The program may be installed in advance in ROM 82 or the storage unit 88.

The program to be executed by the computer may be a program to be executed time sequentially in the order described in this specification, or a program to be executed parallel or at a necessary timing when the program is called or at other timings.

It should be understood by those skilled in the art that various modifications, combinations, sub-combinations and alternations may occur depending on design requirements and other factors insofar as they are within the scope of the appended claims or equivalents thereof.

What is claimed is:

1. An information processing apparatus for determining a function of an electronic apparatus desired by a user to adjust, based on an operation history of adjustment operations made by the user for the function of the electronic apparatus, the information processing apparatus comprising:

strength estimation means for calculating, from the operation history, an operation frequency for each predetermined time period, and estimating a time period of the operation frequency which exceeds a predetermined value as a time period over which the user has a strong desire to adjust;

detecting means for calculating, from the operation history, an operation frequency for each function of the electronic apparatus of the operation history in a time period corresponding to the time period of the strong desire to adjust estimated by the strength estimation means, and detecting a feature of the adjustment operation made by the user for the function of the electronic apparatus, the feature corresponding to the operation frequency for each function of the electronic apparatus; and determination means for determining a function, desired by the user to adjust, of the electronic apparatus, the function corresponding to the feature detected by the detecting means.

2. The information processing apparatus according to claim 1, wherein the detecting means comprises:

frequency distribution generating means for generating a frequency distribution of the operation frequency, for each function of the electronic apparatus, of the operation history in the time period corresponding to the time period of the strong desire to adjust estimated by the strength estimation means;

comparing means for comparing the frequency distribution generated by the frequency distribution generating means with a distribution, corresponding to the feature, of the operation frequency for each function of the electronic apparatus; and feature detection means for detecting the feature using a comparison result by the comparing means.

3. The information processing apparatus according to claim 2, wherein:

the frequency distribution generating means generates a first frequency distribution of the operation frequency, for each function of the electronic apparatus, of the operation history in the time period corresponding to the time period of the strong desire to adjust estimated by the strength estimation means, and a second frequency distribution of the operation frequency, for each function of the electronic apparatus, of the operation history in a time period corresponding to a time period of a weak desire to adjust estimated by the strength estimation means;

the information processing apparatus further comprises normalized frequency distribution calculating means for calculating a normalized frequency distribution by subtracting an operation frequency of the second frequency distribution for the same function from an operation frequency of the first frequency distribution, wherein the comparing means compares the normalized frequency distribution calculated by the normalized frequency distribution generating means with a distribution, corresponding to the feature, of the operation frequency for each function of the electronic apparatus.

4. The information processing apparatus according to claim 1, further comprising providing means for providing the function determined by the determination means to the electronic apparatus or another electronic apparatus.

5. An information processing method for determining a function of an electronic apparatus desired by a user to adjust, based on an operation history of adjustment operations made by the user for the function of the electronic apparatus, the method comprising:

a strength estimation step of calculating, from the operation history, an operation frequency for each predetermined time period, and estimating a time period of the operation frequency which exceeds a predetermined value as a time period over which the user has a strong desire to adjust;

a detecting step of calculating, from the operation history, an operation frequency for each function of the electronic apparatus of the operation history in a time period corresponding to the time period of the strong desire to adjust estimated by the strength estimation step, and detecting a feature of the adjustment operation made by the user for the function of the electronic apparatus, the feature corresponding to the operation frequency for each function of the electronic apparatus; and a determination step of determining a function, desired by the user to adjust, of the electronic apparatus, the function corresponding to the feature detected by the detecting step.

6. A program for making a computer execute information processing for determining a function of an electronic apparatus desired by a user to adjust, based on an operation history of adjustment operations made by the user for the function of the electronic apparatus, the information processing comprising:

a strength estimation step of calculating, from the operation history, an operation frequency for each predetermined time period and estimating a time period of the operation frequency which exceeds a predetermined value as a time period over which the user has a strong desire to adjust;

a detecting step of calculating, from the operation history, an operation frequency for each function of the electronic apparatus of the operation history in a time period corresponding to the time period of the strong desire to adjust estimated by the strength estimation step, and detecting a feature of the adjustment operation made by the user for the function of the electronic apparatus, the feature corresponding to the operation frequency for each function of the electronic apparatus; and a determination step of determining a function, desired by the user to adjust, of the electronic apparatus, the function corresponding to the feature detected by the detecting step.

7. An information processing apparatus for determining a function of an electronic apparatus desired by a user to adjust, based on an operation history of adjustment operations made by the user for the function of the electronic apparatus, the information processing apparatus comprising:

a strength estimation unit configured to calculate, from the operation history, an operation frequency for each predetermined time period and estimate a time period of the operation frequency which exceeds a predetermined value as a time period over which the user has a strong desire to adjust;

a detector configured to calculate, from the operation history, an operation frequency for each function of the electronic apparatus of the operation history in a time period corresponding to the time period of the strong desire to adjust estimated by the strength estimation unit, and detect a feature of the adjustment operation made by the user for the function of the electronic apparatus, the feature corresponding to the operation frequency for each function of the electronic apparatus; and a determination unit configured to determine a function, desired by the user to adjust, of the electronic apparatus, the function corresponding to the feature detected by the detector.

* * * * *